US009851651B2

United States Patent
Jinno

(10) Patent No.: US 9,851,651 B2
(45) Date of Patent: Dec. 26, 2017

(54) IMAGE PROCESSING APPARATUS AND IMAGE PROCESSING METHOD TO CONTROL THE GLOSS OF AN IMAGE TO BE PRINTED

(71) Applicant: CANON KABUSHIKI KAISHA, Tokyo (JP)

(72) Inventor: Takayuki Jinno, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/261,036

(22) Filed: Sep. 9, 2016

(65) Prior Publication Data

US 2017/0075247 A1    Mar. 16, 2017

(30) Foreign Application Priority Data

Sep. 15, 2015  (JP) ................................. 2015-182229
Aug. 26, 2016  (JP) ................................. 2016-166014

(51) Int. Cl.
  *H04N 1/00*   (2006.01)
  *G03G 15/01*  (2006.01)
  *G03G 15/00*  (2006.01)

(52) U.S. Cl.
  CPC ......... *G03G 15/01* (2013.01); *G03G 15/6585* (2013.01); *H04N 1/00* (2013.01)

(58) Field of Classification Search
  None
  See application file for complete search history.

(56) References Cited

FOREIGN PATENT DOCUMENTS

| JP | 2002-331708 A | 11/2002 |
| JP | 2010-284951 A | 12/2010 |

*Primary Examiner* — Barbara Reinier
(74) *Attorney, Agent, or Firm* — Carter, DeLuca, Farrell & Schmidt, LLP

(57) ABSTRACT

A method comprises receiving color data and gloss data of an image, converting the color data into a first signal representing a use amount of a dark print material having a relatively high density, generating a second signal in which a use amount corresponding to the gloss data, of the dark print material use amount indicated by the first signal, is replaced with a use amount corresponding to a light print material having a relatively low density, converting the second signal into path separation data corresponding to each printing scan of an apparatus, and performing halftone processing on the path separation data to generate a print signal indicating a print position of an on-dot, for each of the dark print material and the light print material, thereby generating the print signal which causes superposition of on-dots of the light print material in printing scan of the apparatus.

11 Claims, 23 Drawing Sheets

FIG. 1E
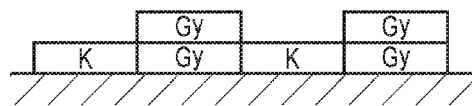 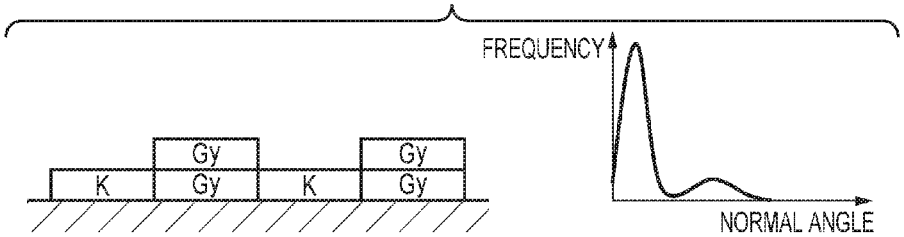
FIG. 1F
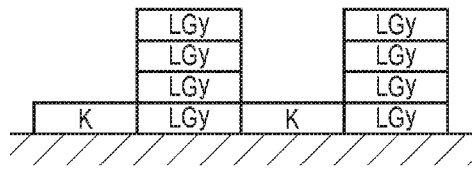 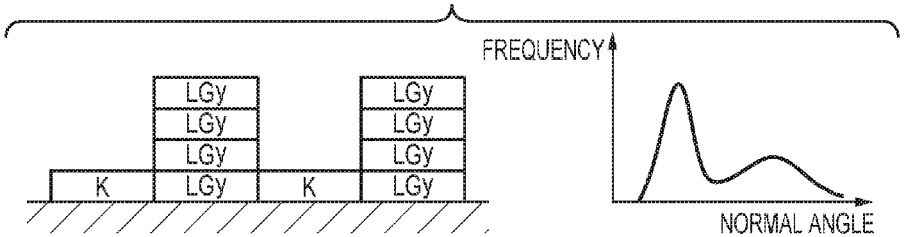
FIG. 1G
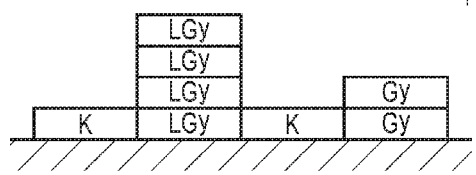 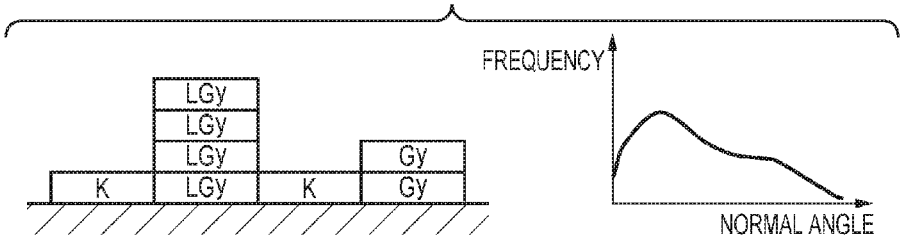

FIG. 3

| R' | G' | B' | C | M | Y | K |
|---|---|---|---|---|---|---|
| 0 | 0 | 0 | 0 | 0 | 0 | 255 |
| 0 | 0 | 16 | 16 | 16 | 0 | 240 |
| 0 | 0 | 32 | 32 | 32 | 0 | 224 |
| 0 | 0 | 48 | 48 | 48 | 0 | 208 |
| 0 | 0 | 64 | 64 | 64 | 0 | 192 |
| 0 | 0 | 80 | 80 | 80 | 0 | 176 |
| 0 | 0 | 96 | 96 | 96 | 0 | 160 |
| 0 | 0 | 112 | 112 | 112 | 0 | 144 |
| 0 | 0 | 128 | 128 | 128 | 0 | 128 |
| 0 | 0 | 144 | 144 | 144 | 0 | 112 |
| 0 | 0 | 160 | 160 | 160 | 0 | 96 |
| 0 | 0 | 176 | 176 | 176 | 0 | 80 |
| 0 | 0 | 192 | 192 | 192 | 0 | 64 |
| 0 | 0 | 208 | 208 | 208 | 0 | 48 |
| 0 | 0 | 224 | 224 | 224 | 0 | 32 |
| 0 | 0 | 240 | 240 | 240 | 0 | 16 |
| 0 | 0 | 255 | 255 | 255 | 0 | 0 |
| 0 | 16 | 0 | 16 | 0 | 16 | 240 |
| 0 | 16 | 16 | 24 | 0 | 0 | 232 |
| 0 | 16 | 32 | 32 | 0 | 16 | 224 |
| ... | ... | ... | ... | ... | ... | ... |
| 255 | 255 | 255 | 0 | 0 | 0 | 0 |

FIG. 6

| PRINT MATERIAL AMOUNT VALUE | | | | GLOSS VALUE | PRINT MATERIAL AMOUNT VALUE | | | | | | |
|---|---|---|---|---|---|---|---|---|---|---|---|
| C | M | Y | K | Gl | C' | M' | Y' | K' | Lc | Lm | Gy |
| 0 | 0 | 0 | 255 | 60 | 0 | 0 | 0 | 255 | 0 | 0 | 0 |
| 0 | 0 | 0 | 255 | 55 | 0 | 0 | 0 | 224 | 0 | 0 | 64 |
| 0 | 0 | 0 | 255 | 50 | 0 | 0 | 0 | 192 | 0 | 0 | 128 |
| 0 | 0 | 0 | 255 | 45 | 0 | 0 | 0 | 160 | 0 | 0 | 192 |
| 0 | 0 | 0 | 255 | 40 | 0 | 0 | 0 | 128 | 0 | 0 | 255 |
| ... | ... | ... | ... | ... | ... | ... | ... | ... | ... | ... | ... |

FIG. 7A

| PRINTING SCAN | PRINT RATE % |
|---|---|
| 1 | 25 |
| 2 | 25 |
| 3 | 25 |
| 4 | 25 |

FIG. 7B

| | 8-BIT SIGNAL 0-255 | | 4-BIT SIGNAL 0-15 | |
|---|---|---|---|---|
| Gl | K' | Gy | K" | Gy" |
| 60 | 255 | 0 | 15 | 0 |
| 55 | 224 | 64 | 14 | 4 |
| 50 | 192 | 128 | 12 | 8 |
| 45 | 160 | 192 | 10 | 12 |
| 40 | 128 | 255 | 8 | 15 |

FIG. 7C

| | PATH SEPARATION DATA OF K" | | | | | PATH SEPARATION DATA OF Gy" | | | | |
|---|---|---|---|---|---|---|---|---|---|---|
| Gl | K" | $K_1$ | $K_2$ | $K_3$ | $K_4$ | Gy" | $Gy_1$ | $Gy_2$ | $Gy_3$ | $Gy_4$ |
| 60 | 15 (16) | 4 | 4 | 4 | 4 | 0 | 0 | 0 | 0 | 0 |
| 55 | 14 | 3 | 4 | 3 | 4 | 4 | 1 | 1 | 1 | 1 |
| 50 | 12 | 3 | 3 | 3 | 3 | 8 | 2 | 2 | 2 | 2 |
| 45 | 10 | 2 | 3 | 2 | 3 | 12 | 3 | 3 | 3 | 3 |
| 40 | 8 | 2 | 2 | 2 | 2 | 15 (16) | 4 | 4 | 4 | 4 |

FIG. 8A

| 1 | 9 | 3 | 11 |
| 13 | 5 | 15 | 7 |
| 4 | 12 | 2 | 10 |
| 16 | 8 | 14 | 6 |

FIG. 8B

| -3 | 5 | -1 | 7 |
| 9 | 1 | 11 | 3 |
| 0 | 8 | -2 | 6 |
| 12 | 4 | 10 | 2 |

FIG. 8C

| 13 | 5 | 15 | 7 |
| 9 | 1 | 11 | 3 |
| 16 | 8 | 14 | 6 |
| 12 | 4 | 10 | 2 |

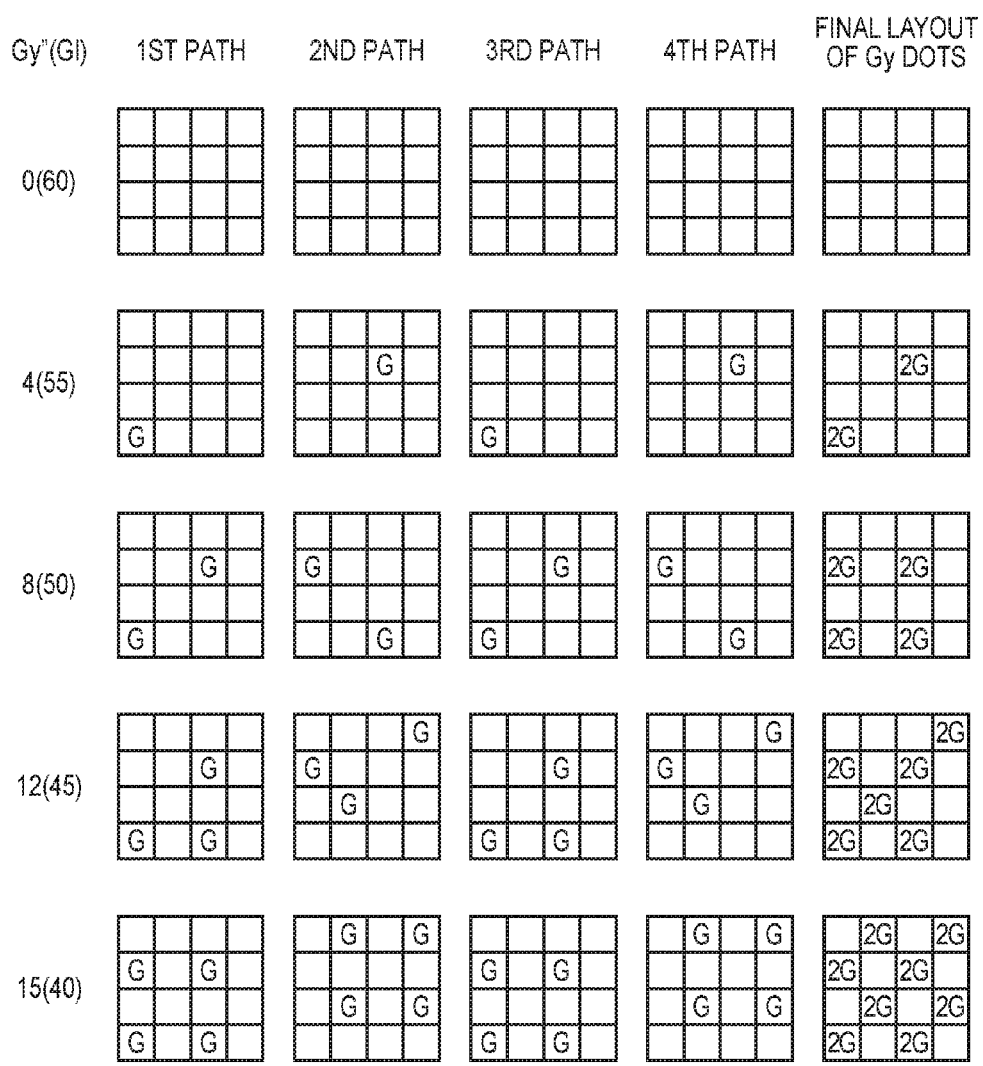

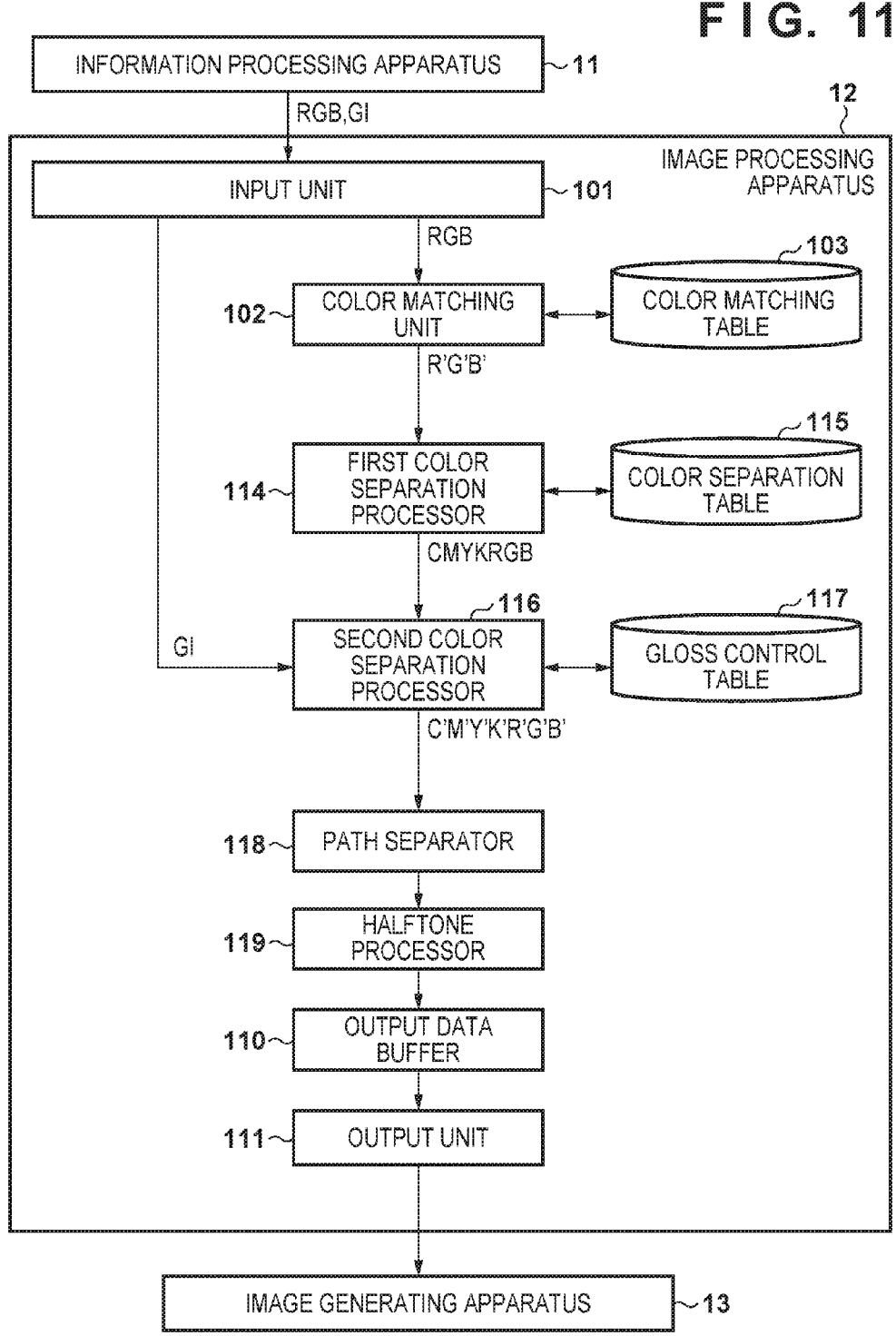

FIG. 12A

| GI | RESULTS OF SECOND COLOR SEPARATION PROCESS (8-BIT SIGNAL) | | | 4-BIT SIGNAL | | |
|---|---|---|---|---|---|---|
| | R' | Y' | M' | R" | Y" | M" |
| 60 | 255 | 0 | 0 | 15 | 0 | 0 |
| 55 | 224 | 32 | 32 | 14 | 2 | 2 |
| 50 | 192 | 64 | 64 | 12 | 4 | 4 |
| 45 | 160 | 96 | 96 | 10 | 6 | 6 |
| 40 | 128 | 128 | 128 | 8 | 8 | 8 |

FIG. 12B

| GI | PATH SEPARATION DATA OF R" | | | | | PATH SEPARATION DATA OF Y" | | | | | PATH SEPARATION DATA OF M" | | | | |
|---|---|---|---|---|---|---|---|---|---|---|---|---|---|---|---|
| | R" | $R_1$ | $R_2$ | $R_3$ | $R_4$ | Y" | $Y_1$ | $Y_2$ | $Y_3$ | $Y_4$ | M" | $M_1$ | $M_2$ | $M_3$ | $M_4$ |
| 60 | 15(16) | 4 | 4 | 4 | 4 | 0 | 0 | 0 | 0 | 0 | 0 | 0 | 0 | 0 | 0 |
| 55 | 14 | 3 | 4 | 3 | 4 | 2 | 0 | 1 | 0 | 1 | 2 | 0 | 1 | 0 | 1 |
| 50 | 12 | 3 | 3 | 3 | 3 | 4 | 1 | 1 | 1 | 1 | 4 | 1 | 1 | 1 | 1 |
| 45 | 10 | 2 | 3 | 2 | 3 | 6 | 1 | 2 | 1 | 2 | 6 | 1 | 2 | 1 | 2 |
| 40 | 8 | 2 | 2 | 2 | 2 | 8 | 2 | 2 | 2 | 2 | 8 | 2 | 2 | 2 | 2 |

| | RESULTS OF CL MATERIAL AMOUNT DETERMINATION (8-BIT SIGNAL) | | 4-BIT SIGNAL | |
|---|---|---|---|---|
| GI | K | CL | K" | CL" |
| 60 | 255 | 0 | 15 | 0 |
| 55 | 255 | 32 | 15 | 2 |
| 50 | 255 | 64 | 15 | 4 |
| 45 | 255 | 96 | 15 | 6 |
| 40 | 255 | 128 | 15 | 8 |

F I G. 16B

| | PATH SEPARATION DATA OF K" | | | | | PATH SEPARATION DATA OF CL" | | | | |
|---|---|---|---|---|---|---|---|---|---|---|
| GI | K" | $K_1$ | $K_2$ | $K_3$ | $K_4$ | CL" | $CL_1$ | $CL_2$ | $CL_3$ | $CL_4$ |
| 60 | 15 (16) | 4 | 4 | 4 | 4 | 0 | 0 | 0 | 0 | 0 |
| 55 | 15 (16) | 4 | 4 | 4 | 4 | 2 | 0 | 1 | 0 | 1 |
| 50 | 15 (16) | 4 | 4 | 4 | 4 | 4 | 1 | 1 | 1 | 1 |
| 45 | 15 (16) | 4 | 4 | 4 | 4 | 6 | 1 | 2 | 1 | 2 |
| 40 | 15 (16) | 4 | 4 | 4 | 4 | 8 | 2 | 2 | 2 | 2 |

FIG. 17A

| K" | 1ST PATH | 2ND PATH | 3RD PATH | 4TH PATH | FINAL LAYOUT OF K DOTS |
|---|---|---|---|---|---|
| 15 | | | | | |

FIG. 17B

| CL"(GI) | 1ST PATH | 2ND PATH | 3RD PATH | 4TH PATH | FINAL LAYOUT OF CL DOTS |
|---|---|---|---|---|---|
| 0(60) | | | | | |
| 2(55) | | | | | |
| 4(50) | | | | | |
| 6(45) | | | | | |
| 8(40) | | | | | |

FIG. 20A

| Gi | RESULTS OF BK MATERIAL SEPARATION (8-BIT SIGNAL) | | | 4-BIT SIGNAL | | |
|---|---|---|---|---|---|---|
| | K' | Gy | Lgy | K" | Gy" | Lgy" |
| 60 | 255 | 0 | 0 | 15 | 0 | 0 |
| 55 | 224 | 64 | 0 | 14 | 4 | 0 |
| 50 | 192 | 96 | 64 | 12 | 6 | 4 |
| 45 | 160 | 128 | 128 | 10 | 8 | 8 |
| 40 | 128 | 128 | 255 | 8 | 8 | 15 |

FIG. 20B

| Gi | PATH SEPARATION DATA OF K" | | | | | PATH SEPARATION DATA OF Gy" | | | | | PATH SEPARATION DATA OF Lgy" | | | | |
|---|---|---|---|---|---|---|---|---|---|---|---|---|---|---|---|
| | K" | $K_1$ | $K_2$ | $K_3$ | $K_4$ | Gy" | $Gy_1$ | $Gy_2$ | $Gy_3$ | $Gy_4$ | Lgy" | $Lgy_1$ | $Lgy_2$ | $Lgy_3$ | $Lgy_4$ |
| 60 | 15 (16) | 4 | 4 | 4 | 4 | 0 | 0 | 0 | 0 | 0 | 0 | 0 | 0 | 0 | 0 |
| 55 | 14 | 3 | 4 | 3 | 4 | 4 | 1 | 1 | 1 | 1 | 0 | 0 | 0 | 0 | 0 |
| 50 | 12 | 3 | 3 | 3 | 3 | 6 | 1 | 2 | 1 | 2 | 4 | 1 | 1 | 1 | 1 |
| 45 | 10 | 2 | 3 | 2 | 3 | 8 | 1 | 1 | 1 | 1 | 8 | 2 | 2 | 2 | 2 |
| 40 | 8 | 2 | 2 | 2 | 2 | 8 | 1 | 1 | 1 | 1 | 15 (16) | 4 | 4 | 4 | 4 |

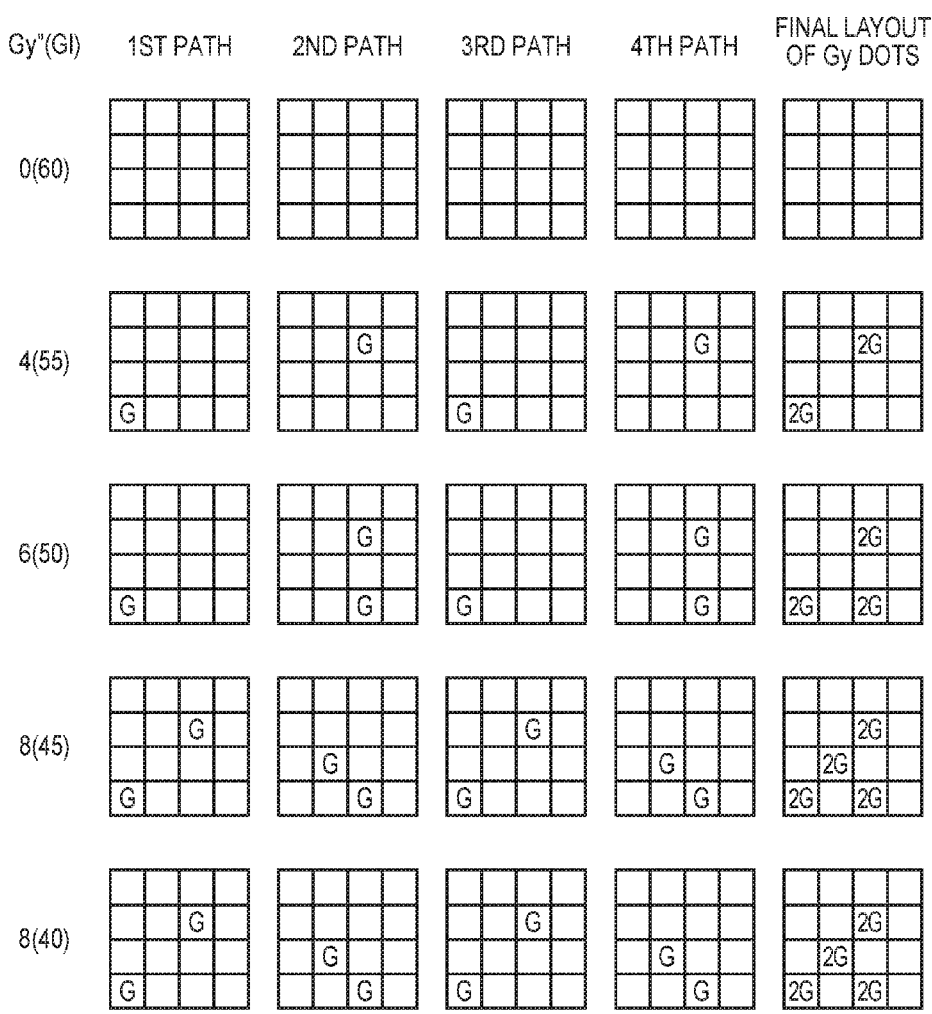

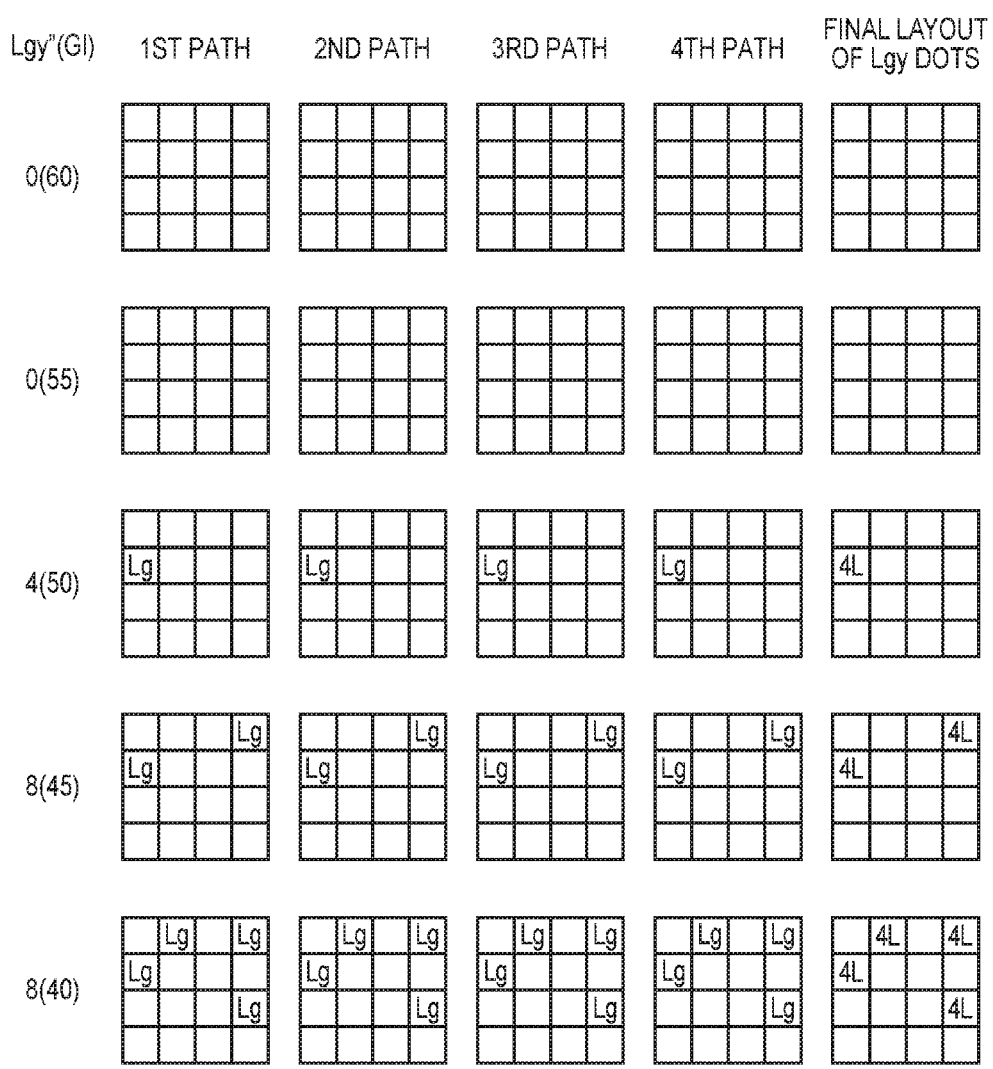

IMAGE PROCESSING APPARATUS AND IMAGE PROCESSING METHOD TO CONTROL THE GLOSS OF AN IMAGE TO BE PRINTED

BACKGROUND OF THE INVENTION

Field of the Invention

The present invention generally relates to an image processing apparatus and an image processing method, particularly to control of the gloss of an image to be generated.

Description of the Related Art

When dye ink using a dye which easily dissolves in water as a coloring material is used in image generation, the coloring material in a solvent permeates fibers of a print medium, so the surface shape of the print medium is maintained even after image generation, and the gloss of the print medium itself is maintained as the gloss of a printed image. However, dye molecules easily decompose with light, and a printed image using dye ink easily fades. Also, when a printed material using dye ink is wet with water, dye molecules having permeated fibers dissolve in water, so a printed image is blurred.

To solve these problems of dye ink, pigment ink using a pigment as a coloring material is recently used in image generation. Unlike a dye which exists in the form of molecules in a solvent, a pigment exists in the form of particles having a size of a few ten nm to a few μm, so a printed material having a high weather resistance is obtained when using pigment ink. A pigment hardly permeates a print medium, but adheres to the surface of a print medium, and forms unevenness on the surface of a printed image, so the gloss of a printed material using pigment ink differs from that of a print medium itself. In addition, due to the characteristics of a resin used in pigment ink and a pigment itself, the surface reflectance of a printed image using pigment ink is higher than that of a printed image using dye ink.

Also, a technique of obtaining a decorating effect by using a gloss difference in a printed material has been developed. For example, Japanese Patent Laid-Open No. 2002-331708 has disclosed an invention of obtaining a decorating effect by changing gloss from one region to another or from one object to another. Recently, a technique of obtaining a decorating effect by using a gloss difference even in a printed material using a pigment ink has been developed.

This technique disclosed in Japanese Patent Laid-Open No. 2002-331708 obtains a desired gloss by determining the use amount of transparent toner as a gloss material based on image clarity set for each object. However, the gloss control range is limited to a range controllable by only the use amount of the gloss material. For example, gloss cannot be controlled at all in a region using no gloss material.

Furthermore, as a technique of controlling gloss although the purpose is not to obtain a decorating effect, Japanese Patent Laid-Open No. 2010-284951 has disclosed an invention which prints ink in the same position in a high-brightness region having a relatively high gloss, thereby increasing the surface unevenness of a printed image and decreasing the gloss. Unfortunately, this method cannot perform control such as an increase in the gloss of a low-brightness region in which the gloss tends to relatively decrease.

As described above, even when obtaining a decorating effect by using a gloss difference in a printed material using pigment ink, no sufficient decorating effect can be obtained because the gloss control range is limited.

SUMMARY OF THE INVENTION

An aspect of the present invention provides gloss control in a printed material.

The aspect of the present invention includes the following arrangement.

An image processing apparatus comprises: an input unit configured to receive color image data and gloss image data of an image to be generated; a first color separation unit configured to convert the color image data into a first print material amount signal representing a use amount of a dark print material having a relatively high density; a second color separation unit configured to generate a second print material amount signal in which a use amount corresponding to the gloss image data, of the dark print material use amount indicated by the first print material amount signal, is replaced with a use amount corresponding to a light print material having a relatively low density; a path separation unit configured to convert the second print material amount signal into path separation data corresponding to each printing scan of an image generating apparatus; and a halftone processing unit configured to perform halftone processing on the path separation data to generate a print signal indicating a print position of an on-dot, for each of the dark print material and the light print material, thereby generating the print signal which causes superposition of on-dots of the light print material in printing scan of the image generating apparatus.

An image processing apparatus comprises: an input unit configured to receive color image data and gloss image data of an image to be generated; a first color separation unit configured to convert the color image data into a first print material amount signal representing a use amount of a basic-color print material and a use amount of a spot-color print material which reproduces a color different from the basic-color print material; a second color separation unit configured to generate a second print material amount signal in which a use amount corresponding to the gloss image data, of the spot-color print material use amount indicated by the first print material amount signal, is replaced with use amounts corresponding to a plurality of basic-color print materials corresponding to the spot-color print material; a path separation unit configured to convert the second print material amount signal into path separation data corresponding to each printing scan of an image generating apparatus; and a halftone processing unit configured to perform halftone processing on the path separation data to generate a print signal indicating a print position of an on-dot, for each of the basic-color print material and the spot-color print material, thereby generating the print signal which causes superposition of on-dots of the plurality of basic-color print materials corresponding to the spot-color print material in printing scan of the image generating apparatus.

An image processing method comprises: receiving color image data and gloss image data of an image to be generated; converting the color image data into a first print material amount signal representing a use amount of a dark print material having a relatively high density; generating a second print material amount signal in which a use amount corresponding to the gloss image data, of the dark print material use amount indicated by the first print material amount signal, is replaced with a use amount corresponding to a light print material having a relatively low density; converting the second print material amount signal into path separation data corresponding to each printing scan of an image generating apparatus; and performing halftone processing on the path separation data to generate a print signal indicating a print position of an on-dot, for each of the dark print material and the light print material, thereby generating the print signal which causes superposition of on-dots of the light print material in printing scan of the image generating apparatus.

An image processing method comprises: receiving color image data and gloss image data of an image to be generated; converting the color image data into a first print material amount signal representing a use amount of a basic-color print material and a use amount of a spot-color print material which reproduces a color different from the basic-color print material; generating a second print material amount signal in which a use amount corresponding to the gloss image data, of the spot-color print material use amount indicated by the first print material amount signal, is replaced with use amounts corresponding to a plurality of basic-color print materials corresponding to the spot-color print material; converting the second print material amount signal into path separation data corresponding to each printing scan of an image generating apparatus; and performing halftone processing on the path separation data to generate a print signal indicating a print position of an on-dot, for each of the basic-color print material and the spot-color print material, thereby generating the print signal which causes superposition of on-dots of the plurality of basic-color print materials corresponding to the spot-color print material in printing scan of the image generating apparatus.

An exemplary aspect of the present invention makes it possible to control the gloss of a printed material. For example, the gloss control range of a printed material expands, so a higher decorating effect can be given to the printed material.

Further features of the present invention will become apparent from the following description of exemplary embodiments (with reference to the attached drawings).

BRIEF DESCRIPTION OF THE DRAWINGS

FIGS. 1A, 1B, 1C, 1D, 1E, 1F, and 1G are views schematically showing states in which pigment print materials are stacked on a print medium;

FIG. 3 is a view showing an example of a color separation table which a first color separation processor looks up;

FIG. 6 is a view showing an example of a gloss control table which a second color separation processor looks up;

FIGS. 7A, 7B, and 7C are views for explaining a path separation process;

FIGS. 8A, 8B, and 8C are views showing examples of a 4×4 dither matrix for halftone processing which quantizes path separation data of a K" signal into a 1-bit driving signal;

FIGS. 10A and 10B are views for explaining halftone processing of path separation data of a Gy" value;

FIG. 11 is a block diagram showing a configuration example of an image processing apparatus of the second embodiment;

FIGS. 12A and 12B are views for explaining gloss control conversion and a path separation process;

FIG. 13 is a view showing the results of halftone processing of path separation data of an R" value;

FIGS. 16A and 16B are views for explaining the determination of a CL value and a path separation process;

FIGS. 17A and 17B are views for explaining halftone processing;

FIGS. 20A and 20B are views for explaining gloss control conversion and a path separation process;

FIGS. 21A and 21B are views for explaining a halftone processing of a Gy print material;

FIGS. 22A and 22B are views for explaining halftone processing of an Lgy print material.

DESCRIPTION OF THE EMBODIMENTS

An image processing apparatus and an image processing method according to an embodiment of the present invention will be described in detail below with reference to the accompanying drawings. Note that the embodiment is not intended to limit the present invention to the scope of the appended claims, and not all combinations of arrangements described in the embodiment are indispensable for the means to solve the problems according to the present invention.

[Outline]

Figure 1A:

FIGS. 1A, 1B, 1C, 1D, 1E, 1F, and 1G schematically show states in which pigment print materials are stacked on a print medium. FIG. 1A shows a state in which an image is generated by a black (K) print material in the whole area of a predetermined region. In this embodiment, an area represents a minimum unit for which dot-on/off is controllable.

Figure 1B:
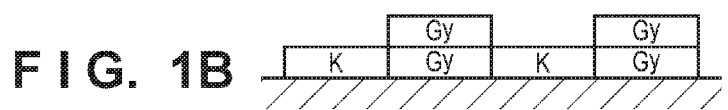

FIG. 1B shows a state in which an image is generated by combining the K print material and a gray (Gy) print material. The reproduced color is equal to that shown in FIG. 1A. Referring to FIG. 1B, one layer of the K print material is formed in a given area, but two layers of the Gy print material are stacked in another area. That is, as shown in FIGS. 1A and 1B, the unevenness of an image surface in a predetermined region can be changed while reproducing the same color, in accordance with a print material to be used, a combination of print materials, the use amount of a print material, and the stacked state of print materials.

Since a print material itself has unevenness and the shape of a dot is almost a circle when viewed from above, the surface of the image shown in FIG. 1A is not completely smooth but relatively smooth. On the other hand, in the case shown in FIG. 1B, the thickness of the print material layer in one area differs from that in another area, so the smoothness decreases when compared to that in the case shown in FIG. 1A. That is, the image shown in FIG. 1B develops the same color as that of the image shown in FIG. 1A, but has gloss lower than that of the image shown in FIG. 1A.

More specifically, as gloss indicated by a gloss signal decreases, a print material (to be referred to as a dark print material hereinafter) having a relatively high density is replaced with a print material (to be referred to as a light print material hereinafter) having a relatively low density, and a color is reproduced by overlaying the light print material, thereby increasing the unevenness of the surface of an image. This makes gloss control possible.

In the following explanation, the stacked state of print materials indicates the colors of the print materials and the stacking order of the print materials. Also, the following explanation is based on a combination of print materials by which the color development of n layers (n is a natural number) of a first print material (for example, a K print material) and the color development of m layers (m is a natural number, n<m) of a second print material (for example, a Gy print material) can be regarded as equal.

Furthermore, it is also possible to use a third print material (for example, a light gray (Lgy) print material) having a density lower than those of the first and second print materials. It is, of course, also possible to use a combination of a cyan (C) print material and light cyan (Lc) print material, and a combination of a magenta (M) print material and light magenta (Lm) print material, in addition to a combination of black-based print materials. For the sake of descriptive simplicity, a combination of the K print material and Gy print material will mainly be explained below.

First Embodiment

Configuration of Apparatus

Figure 2:
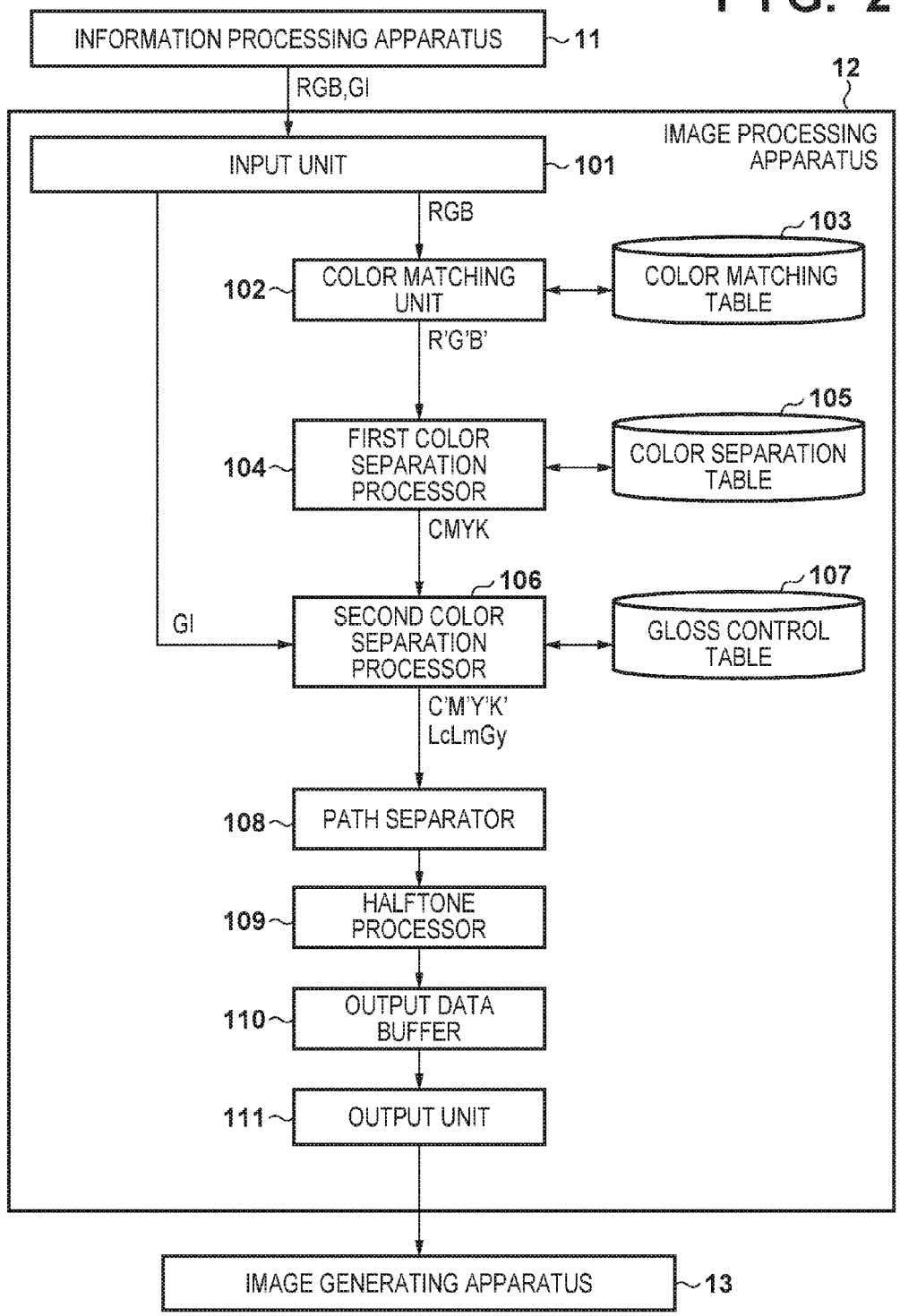
FIG. 2 is a block diagram showing a configuration example of an image processing apparatus of the first embodiment.

FIG. 2 is a block diagram showing a configuration example of an image processing apparatus 12 of the first embodiment. Referring to FIG. 2, an input unit 101 receives color image data RGB representing the color of each pixel of an image to be printed, and gloss image data GI representing the image clarity of each pixel of the image to be printed, from an information processing apparatus 11.

If the resolution of the input data (the color image data RGB and gloss image data GI) and the print resolution of an image generating apparatus 13 are different, the input unit 101 performs resolution conversion which equalizes the two resolutions. When the resolution of the input data is 600 ppi and the printing resolution is 2,400 dpi in the main scanning direction and 1,200 dpi in the sub scanning direction, the input unit 101 converts the input data into data having a resolution of 2,400 dpi in the main scanning direction and that of 1,200 dpi in the sub scanning direction, by resolution conversion such as a bicubic method.

The color image data RGB and gloss image data GI are data generated and edited or processed by various applications running on the image processing apparatus 11 as a computer apparatus, and the color image data RGB is, for example, sRGB data. The color image data RGB and gloss image data GI may also be acquired from an image input device, a recording medium such as a memory card, or a web site, instead of the information processing apparatus 11. Also, a serial bus interface such as a USB or a network interface such as a wired or wireless LAN can be used as the input unit 101.

A color matching unit 102 looks up a color matching table 103 in the form of a lookup table (LUT), and outputs R'G'B' signals by mapping the sRGB data in the color gamut of the image generating apparatus 13. The R'G'B' signals contain an 8-bit signal for each color. A plurality of tables corresponding to the types of print media and the purposes of image generation are prepared as the color matching table 103, and the user can select an appropriate table.

A first color separation processor 104 looks up a color separation table 105 in the form of an LUT, and converts the R'G'B' signals output from the color matching unit 102 into coloring material amount signals CMYK. The coloring material amount signals CMYK indicate the use amounts of dark print materials of cyan C, magenta M, yellow Y, and black K of the image generating apparatus 13, and contain an 8-bit signal for each color. The above processing converts the color image data RGB into print data CMYK.

For example, when the coloring material amount signals CMYK are (0, 20, 100, 255), the dots of coloring materials CMYK are respectively printed at probabilities of 0/255, 20/255, 100/255, and 255/255. In other words, in an image having n pixels, 0/255×n C dots, 20/255×n M dots, 100/255×n Y dots, and 255/255×n K dots are printed. For example, in an image in which the coloring material amount signals CMYK of all of 16×16 pixels (n=256) are (0, 20, 100, 255), 0 C dot, 20 M dots, 100 Y dots, and 256 K dots are printed.

FIG. 3 shows an example of the color separation table 105 which the first color separation processor 104 looks up. The color separation table 105 shows $17^3$=4913 lattice points at which each of R'G'B' has one of 17 values, that is, 0, 16, 32, 48, 64, 80, 96, 112, 128, 144, 160, 176, 192, 208, 224, 240, and 255. The color separation table 105 stores coloring material amount signal values (output values) corresponding to the R'G'B' values (input values) at each lattice point.

A second color separation processor 106 receives the CMYK signals output from the first color separation processor 104 and the gloss image data GI, and converts the CMYK signals into C'M'Y'K'LcLmGy signals containing the signal values of light print materials based on the gloss image data GI. As will be described in detail later, the second color separation processor 106 performs conversion by which the total value of the C'M'Y'K'LcLmGy signals becomes larger than that of the CMYK signals as the gloss value indicated by the gloss image data GI decreases.

As described above, the number of stacked layers of a print material must be increased in order to increase the unevenness of the surface of a printed image as the gloss to be reproduced decreases. Accordingly, conversion is so performed as to replace the use amount of a dark print material with a use amount corresponding to a light print material as the gloss value decreases. This conversion performed by the second color separation processor 106 will be called "gloss control conversion" hereinafter.

The two types of color separation processes of the first and second color separation processors 104 and 106 are performed in order to directly use the CMYK signals in a subsequent process without performing the gloss control conversion if no decorating printing is to be performed, that is, if the gloss image data GI is not input. In other words, if the gloss image data GI is not input, the second color separation processor 106 lets the CMYK signals pass through.

A path separator 108 performs a path separation process of allocating the C'M'Y'K'LcLmGy signals output from the second color separation processor 106 to each printing scan (path) of the image generating apparatus 13 which performs multipath printing. A detailed explanation of multipath printing will be omitted. As will be described in detail later, to stack the same light print material based on the gloss value in order to control the unevenness of the surface of a printed image, the same print material must be printed in the same region, and this is implemented by performing printing scan a plurality of times.

As will be described in detail later, a halftone processor 109 performs a process of determining the dot layout of $C_iM_iY_iK_iLc_iLm_iGy_i$ having undergone the path separation process, and generates driving data for driving each print element of a printhead of the image generating apparatus 13.

An output data buffer 110 stores the driving data output from the halftone processor 109 as image generation data. This image generation data stored in the output data buffer 110 is output to the image generating apparatus 13 via an output unit 111 in synchronism with an image generating operation of the image generating apparatus 13. As the output unit 111, it is possible to use a versatile interface such as a USB, eSATA, PCI, or PCIe (registered trademark) or a dedicated interface.

[Image Generating Apparatus & Information Processing Apparatus]

Although details of the arrangement of the image generating apparatus 13 will be omitted, the image generating apparatus 13 vertically and horizontally moves the printhead relative to the print medium, thereby printing a binary image of each coloring material represented by the image generation data on the print medium. Also, the image generating apparatus 13 adopts a multipath printing method which completes an image by scanning the print medium with the printhead a plurality of times, and adopts a so-called two-way printing method which performs a printing operation in both forward scan and backward scan of the printhead. Furthermore, as described previously, the image generating apparatus 13 can perform printing scan in the same region of the print medium by using the same print material a plurality of times by using a plurality of print elements.

Figure 4:
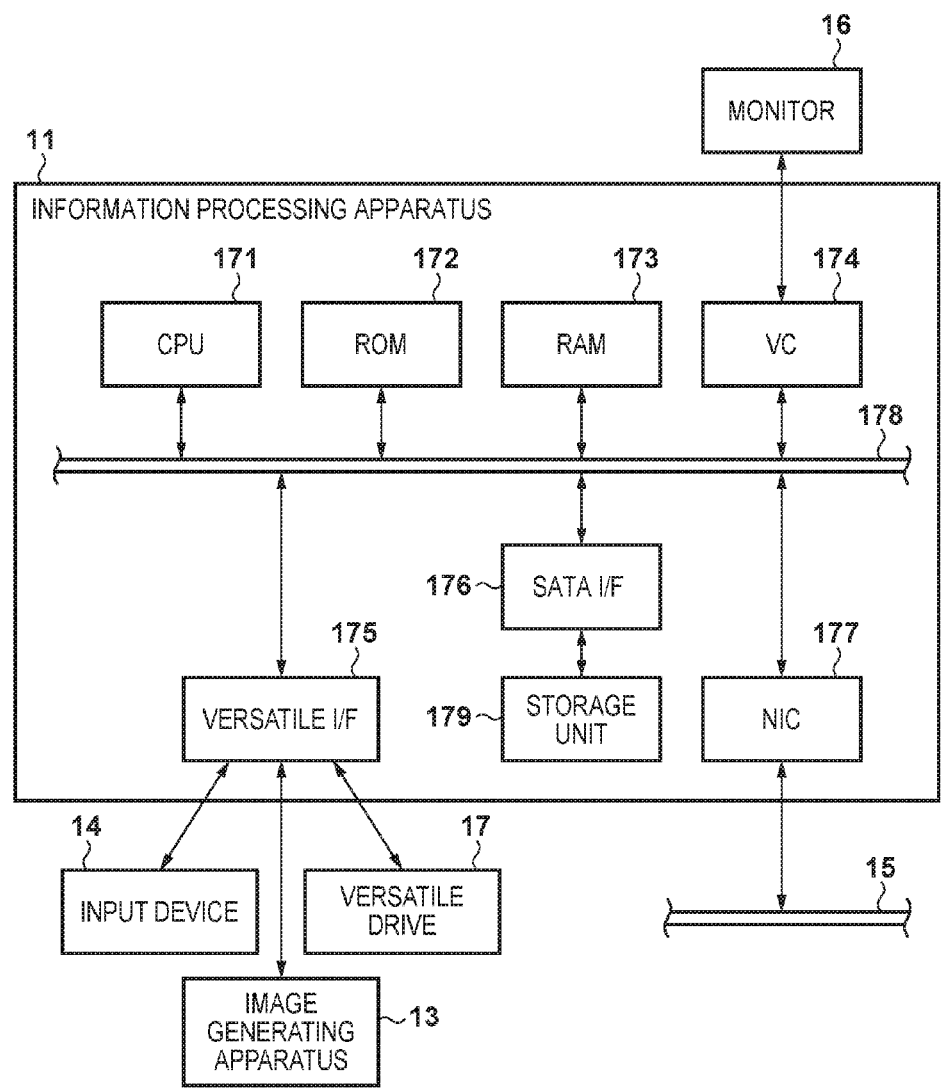
FIG. 4 is a block diagram showing a configuration example of an information processing apparatus.

FIG. 4 is a block diagram showing a configuration example of the information processing apparatus 11. A CPU 171 uses a RAM 173 as a work memory, and executes an OS and various programs stored in a ROM 172 and a storage unit 179, thereby controlling individual units (to be described below) via a system bus 178.

The storage unit 179 is, for example, an HDD, SSD, or flash memory connected to the system bus 178 via an SATA interface (I/F) 176. A versatile I/F 175 is a serial bus interface such as a USB. An input device 14 such as a mouse or keyboard, the image generating apparatus 13, and a versatile drive 17 for a recording medium are connected to the versatile I/F 175.

The CPU 171 loads a program designated by the user via the input device 14 into the RAM 173 from the storage unit 179, and displays a user interface on a monitor 16 connected to a video card (VC) 174 by executing the program. The user selects, generates, and edits color image data and gloss image data to be input to the image processing apparatus 12, by using the user interface. Note that the color image data and gloss image data, or data as the basis of these image data, are stored in the storage unit 179 or the recording medium in the versatile drive 17.

A network interface card (NIC) 177 is a network interface for connecting the information processing apparatus 11 to a network 15 such as a wired LAN or wireless LAN. Programs to be executed by the information processing apparatus 11, the color image data and gloss image data, or the data as the basis of these image data may also be stored in a server apparatus on the network.

The processing and function of the image processing apparatus 12 can be implemented by a printer driver for the image generating apparatus 13, which is executed by the information processing apparatus 11. It is, of course, also possible to install the image processing apparatus 12 as hardware in the image generating apparatus 13. Alternatively, it is also possible to implement the input unit 101, color matching unit 102, and first color separation processor 104 as parts of the image processing apparatus 12 by printer drivers, and install the units from the second color separation processor 106 as hardware in the image generating apparatus 13.

[Image Processing]

Figure 5:
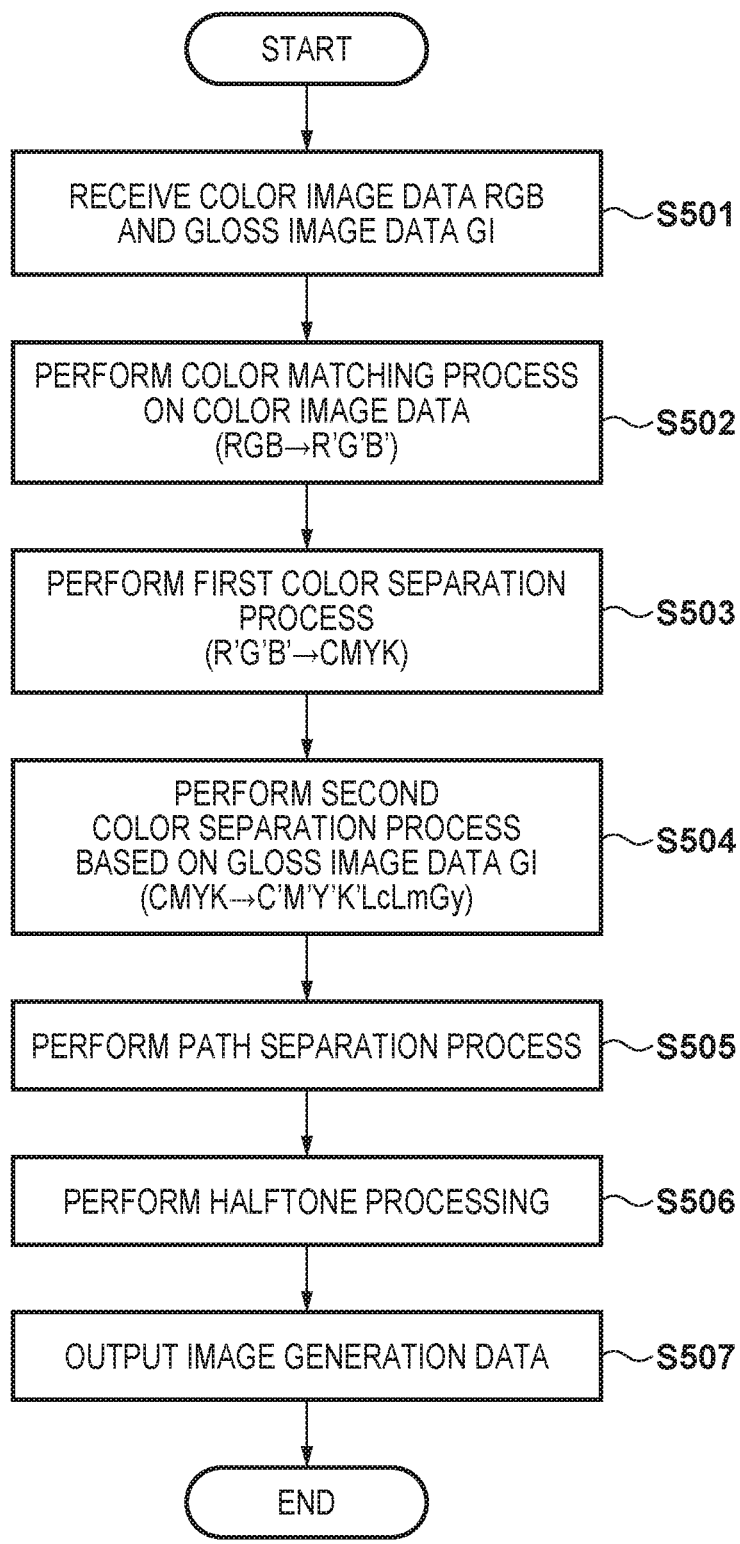
FIG. 5 is a flowchart for explaining an image generation data generating process performed by the image processing apparatus.

FIG. 5 is a flowchart for explaining an image generation data generating process performed by the image processing apparatus 12. The input unit 101 receives color image data RGB and gloss image data GI (step S501). The color matching unit 102 executes a color matching process of converting the input color image data RGB into color signals R'G'B' depending on the image generating apparatus 13 (step S502).

The first color separation processor 104 executes a first color separation process of converting the color signals R'G'B' into print material amount signals CMYK (step S503). Based on the input gloss image data GI, the second color separation processor 106 executes a second color separation process of converting the print material amount signals CMYK into print material amount signals C'M'Y'K'LcLmGy containing the signal values of light print materials (step S504).

The path separator 108 executes a path separation process of multipath-printing the print material amount signals C'M'Y'K'LcLmGy (step S505). The halftone processor 109 executes halftone processing of converting the results of the path separation process into driving data for driving each print element of the image generating apparatus 13 (step S506).

The output unit 111 outputs the image generation data stored in the output data buffer 110 to the image generating apparatus 13 in synchronism with the image generating operation of the image generating apparatus 13 (step S507). The image generation data is output as a whole image or for each unit such as the band width of printing scan. Also, the process from step S501 to step S506 is repetitively executed pixel by pixel.

[Second Color Separation Processor]

As described previously, based on the gloss image data GI, the second color separation processor 106 converts the coloring material amount signals CMYK output from the first color separation processor 104 into the print material amount signals C'M'Y'K'LcLmGy containing the signal values of light print materials. This conversion is performed such that the total value of the C'M'Y'K'LcLmGy signals becomes larger than that of the CMYK signals as the gloss value indicated by the gloss image data GI decreases. This increases the unevenness of the surface of a printed image by increasing the number of stacked layers of a print material, and decreases gloss reproduced by the printed image.

The gloss value will be explained by using an image clarity value C represented in an image clarity test method of measuring the sharpness of an image of an object reflected on a sample surface. Note that in the following explanation, the gloss value will be denoted by GI in order to avoid confusion between the image clarity value C and a cyan material amount value C. It is confirmed that a decorating effect can be given to a printed material by changing the image sharpness, and the image sharpness can be controlled by controlling the unevenness of the surface of a printed image. In addition, it is possible to use any index indicating the degree of gloss of a sample, such as a reflection haze defined in a haze measuring method of measuring the degree of haze on a sample surface, or a specular image clarity.

Each of the abovementioned indices is an index indicating different values when the unevenness of the surface of a printed image changes. Of the abovementioned indices, however, only the reflection haze is an index which increases its value as gloss decreases. Since a gloss value which increases its value as gloss increases will be explained hereinafter, processing such as using reciprocal numbers is necessary when using the reflection haze. Furthermore, these indices sometimes have no linear relationship with a glossy feeling of an image observer. Therefore, to allow the user to intuitively understand the relationship between the gloss value and glossy feeling when generating the gloss image data GI, it is favorable to perform appropriate conversion based on an index to be used as the gloss value.

FIG. 6 shows an example of the gloss control table 107 which the second color separation processor 106 looks up. For example, the gloss control table 107 defines five gloss values GI for a combination of one of nine values, that is, 0, 32, 64, 96, 128, 160, 192, 224, and 255 for each of CMYK, and one of CMYK values, and shows $9^3 \times 5 = 3645$ lattice points. For example, 60, 55, 50, 45, and 40 are defined as the gloss values GI. The gloss control table 107 stores coloring material amount signal values (output values) corresponding to the CMYKGI values (input values) of each lattice point.

For example, when the gloss value GI changes when CMYK=(0, 0, 0, 255), the output value changes, and the use amount of the K print material is replaced with a use amount corresponding to the Gy print material as the GI value decreases, so the Gy value increases. Also, this embodiment will be explained by assuming that the number of stacked layers of the Gy print material is two, and the processing result of the second color separation processor 106 takes account of the number of stacked layers. When a value obtained by dividing the Gy value by 2 is added to the K' value, the sum is 256 regardless of the gloss value GI. However, the sum is 255 only when GI=60 for Gy=0.

If the input CMYKGI value is the value of a lattice point in the gloss control table 107, the second color separation processor 106 outputs the coloring material amount signals C'M'Y'K'LcLmGy printed in the lattice point. If the input CMYKGI value is a value between lattice points of the gloss control table 107, the second color separation processor 106 outputs the coloring material amount signals C'M'Y'K'LcLmGy by an interpolation process using values printed in lattice points surrounding the input value.

In the example shown in FIG. 6, the gloss reproduction range of the image generating apparatus 13 is 40≤GI≤60. That is, it is difficult to reproduce gloss values exceeding the upper limit (60 in the example shown in FIG. 6) of gloss, and reproduce gloss equivalent to gloss values smaller than the lower limit (GI<40 in the example shown in FIG. 6). Note that if an unreproducible gloss value is input, an application of the information processing apparatus 11 preferably generates an alarm.

If an unreproducible GI value is input, the second color separation processor 106 performs the second color separation process by clipping the GI value to the upper limit or lower limit, thereby setting the GI value within the gloss reproduction range. That is, if the GI value is equal to or smaller than the upper limit of the gloss reproduction range, a use amount corresponding to the GI value, of the use amounts of dark print materials indicated by the CMYK signal, is replaced with a use amount corresponding to a light print material, so the sum total of the C'M'Y'K'LcLmGy signal values becomes larger than that of the CMYK signal values. This use amount replacement is performed when the GI value is equal to or smaller than the upper limit of the gloss reproduction range, and the replacement amount in this use amount replacement increases as the GI value decreases.

The example in which the second color separation processor 106 uses a multidimensional LUT has been explained above. However, the second color separation processor 106 may also perform the second color separation process by using:

$$
\begin{aligned}
&\text{if (Gl > 60) Gl = 60;} \\
&\text{if (Gl < 40) Gl = 40;} \\
&\text{if (C < 255) \{} \\
&\quad \text{C' = C - Wc} \times \text{(Glm - Gl);} \\
&\text{\}else\{} \\
&\quad \text{C' = C +1 - Wc} \times \text{(Glm - Gl);} \\
&\text{\}} \\
&\text{if (C' > 255) C' = 255;} \\
&\text{if (C' < ) C' = 0;} \\
&\text{if (M < 255) \{} \\
&\quad \text{M' = M - Wm} \times \text{(Glm - Gl);} \\
&\text{\}else\{} \\
&\quad \text{M' = M + 1 - Wm} \times \text{(Glm - Gl);} \\
&\text{\}} \\
&\text{if (M' > 255) M' = 255;} \\
&\text{if (M' < 0) M' = 0;} \\
&\text{Y' = Y;} \\
&\text{if (K < 255) \{} \\
&\quad \text{K' = K - Wk} \times \text{(Glm - Gl);} \\
&\text{\}else\{} \\
&\quad \text{K' = K + 1 - Wk} \times \text{(Glm - Gl);} \\
&\text{\}} \\
&\text{if (K' > 255) K' = 255;} \\
&\text{if (K' < 0) K' = 0;} \\
&\text{Lc = Nlc} \times \text{Wc} \times \text{(Glm - Gl)} \\
&\text{Lm = Nlm} \times \text{Wm} \times \text{(Glm - Gl);} \\
&\text{Gy = Ngy} \times \text{Wk} \times \text{(Glm - Gl);}
\end{aligned}
\tag{1}
$$

where Glm is the upper limit of the gloss reproduction range,

Wc, Wm, and Wk are weighting factors depending on the value of C, M, K, and

Nlc, Nlm, and Ngy are the numbers of stacked layers.

Colorimetry is performed on a printed material in which the number of stacked layers (or the use amount) of a light print material is changed, and the number of stacked layers (or the use amount) of the light print material by which almost the same density as that of the use amount of a dark print material is obtained is used as the number of stacked layers of the light print material when replacing K with Gy, C with Lc, and M with Lm. Alternatively, the number of stacked layers can also be obtained by the following equations from the colorimetric value of a printed material in which one layer (or an equal amount) of each print material is printed.

First, a reflectance R'(K) or R'(Gy) of an image obtained by printing one layer (or an equal amount) of the K print material or Gy print material on a print medium can be represented by:

$$R'(K) = R(K) \times Rp;$$

$$R'(Gy) = R(Gy) \times Rp; \tag{2}$$

where R(K) is the reflectance of the K print material alone,

R(Gy) is the reflectance of the Gy print material alone, and

Rp is the reflectance of the print medium itself.

Since R'(K), R'(Gy), and Rp in equations (2) are measureable, the reflectances R(K) and R(Gy) can be calculated.

Also, a reflectance R'(Gy_Ngy) when the Gy print material is stacked Ngy times on a print medium can be represented by:

$$R'(Gy\_Ngy) = R(Gy)^{Ngy} \times Rp; \quad (3)$$

Accordingly, the number Ngy of stacked layers for obtaining R'(K)=R'(Gy_Ngy) is represented by:

$$Ngy = \log\{R(K)\}/\log\{R(Gy)\}; \quad (4)$$

Note that a natural number nearest to Ngy calculated by equation (4) need only be set as the number of stacked layers. Note also that the weighting factors Wc, Wm, and Wk can be set by measuring the gloss value GI of a printed material in which the ratio (area ratio) at which a dark print material is replaced with a light print material is changed.

●Ly Print Material

The above explanation is based on the assumption that a light yellow (Ly) print material as a light print material corresponding to the Y print material is not installed in the image generating apparatus 13, so the explanation has been made by assuming that Y'=Y. This is so because the density of the Y print material is low, so the Ly print material is not generally used. However, gloss cannot be controlled in a region where C=0, M=0, Y>0, and K=0, so the Ly print material is preferably installed in the image generating apparatus 13. In this case, the Y value is replaced with the Ly value in accordance with:

```
if (Y < 255) {                                    (5)
    Y' = Y - Wy × (Glm - Gl);
}else{
    Y' = Y + 1 - Wy × (Glm - Gl);
}
    if (Y' > 255) Y' = 255;
    if (Y' < 0) Y' = 0;
Ly = Nly × Wy × (Glm - Gl);
    if (Ly > 255) Ly = 255;
``` where Glm is the upper limit of the gloss reproduction range,

Wy is a weighting factor depending on the value of C, M, K, and

Nly is the number of stacked layers.

[Path Separator]

The path separator 108 performs a path separation process of allocating the C'M'Y'K'LcLmGy signals output from the second color separation processor 106 to each printing scan (path).

A multipath printing method will briefly be explained below. Inkjet printing methods include a line method which uses a printhead including print elements corresponding to the print width, and prints an image by moving (feeding) only a print medium in the sub scanning direction. There is also a serial method which uses a printhead including print elements smaller in number to those of the line-type printhead, and sequentially prints an image by alternately repeating movement (printing main scan) of the printhead in the main scanning direction and paper feed. "Printing main scan" is to move (scan) a carriage on which the printhead is mounted with respect to a print medium, and "paper feed" is to feed a print medium by a predetermined length at one time in a direction perpendicular to the direction of printing main scan.

The width of a region to be printed by performing printing main scan once is determined by the array density and number of print elements of a printhead. When printing an image by performing printing scan once, a position at which a print material arrives at a print medium varies due to the influence of, for example, the manufacturing error of a print element, and an air stream generated around the printhead by printing main scan. Consequently, a shaded line called "banding" forms and deteriorates the image quality.

The multipath printing method is adopted in order to alleviate the above problem and increase the image quality. In this embodiment, a light print material is stacked in order to control the unevenness of the surface of a printed image. Accordingly, it is necessary to print the same print material in the same region, and multipath printing which implements this is performed by performing printing scan a plurality of times.

The multipath printing method completes an image by performing printing main scan a plurality of times. Therefore, printable image generation data is not entirely printed by performing printing main scan once. The path separation process will be explained with reference to FIGS. 7A, 7B, and 7C. FIG. 7A shows an example of a print rate table showing the print rate of each printing scan. The values of the C'M'Y'K'LcLmGy signals are allocated to each printing scan (path) in accordance with the print rate table. In other words, a value obtained by multiplying the signal value by the print rate is the use amount of a print material in each path.

When the unit region of the halftone processing in a subsequent stage has, for example, 4×4 dots, the number of gray levels reproducible by 4×4 dots is 16. In this case, the path separator 108 converts the C'M'Y'K'LcLmGy signals having 8 bits for each color into signals having 4 bits for each color and representing 0 to 15. FIG. 7B shows the results of conversion of the upper 4 bits of K'Gy values (8 bits for each color) having undergone the second color separation process into the signals having 4 bits for each color.

FIG. 7C shows path separation data obtained by allocating K"Gy" values converted into 4 bits to each path based on the print rate, that is, shows the outputs from the path separator 108. The path separator 108 converts the C'M'Y'K'LcLmGy signals into $C_iM_iY_iK_iLc_iLm_iGy_i$ as path separation data of the ith path.

The path separator 108 determines path separation data in order from the first path in accordance with the print rate table, and performs processing similar to an error diffusion process which propagates a residue to the next path. That is, an error (residue) of a path of interest is propagated to the next path, and path separation data of the path of interest is determined by a signal value obtained by adding the error and the print rate of the next path. Also, when the 4-bit signal value is 0xF=15, the path separator 108 performs the path separation process by assuming that the signal value is "16". Note that FIGS. 7B and 7C also show the GI value for reference, but it is needless to say that the GI value has no relation to the processing of the path separator 108.

[Halftone Processor]

The halftone processor 109 determines a dot layout corresponding to the path separation data $C_iM_iY_iK_iLc_iLm_iGy_i$. That is, the halftone processor 109 generates, for each print material, a 1-bit print signal indicating the print position of an on-dot from the path separation data. This print signal is output as a (1-bit) driving signal for each print element of the image generating apparatus 13 via the output unit 111.

●Dark Print Material

FIGS. 8A, 8B, and 8C show examples of a 4×4 dither matrix for halftone processing of quantizing the path separation data of the K" signal into the 1-bit driving signal. That is, the halftone processor 109 determines the dot layout of each path of the K print material by using the dither matrices shown in FIGS. 8A, 8B, and 8C.

In the first path, the halftone processor 109 sets '1' (dot-on) as print signals in order from a cell having a minimum value to a cell having a value equal to the path separation data in an initial dither matrix (FIG. 8A), and '0' (dot-off) as print signals of other cells.

Then, the halftone processor 109 subtracts the path separation data of the first path from the value of each cell of the dither matrix. If a cell having a value smaller than 0 appears, the halftone processor 109 adds 16 to the cell in order to maintain the cell value within the range of 1 to 16. FIGS. 8B and 8C each show update of the dither matrix when the path separation data is "4".

In the second path, the halftone processor 109 performs the same processing as in the first path by using the updated dither matrix (FIG. 8C). The dot layout of each path of the dark print material is determined by repetitively executing processing like this for all paths.

Figure 9:
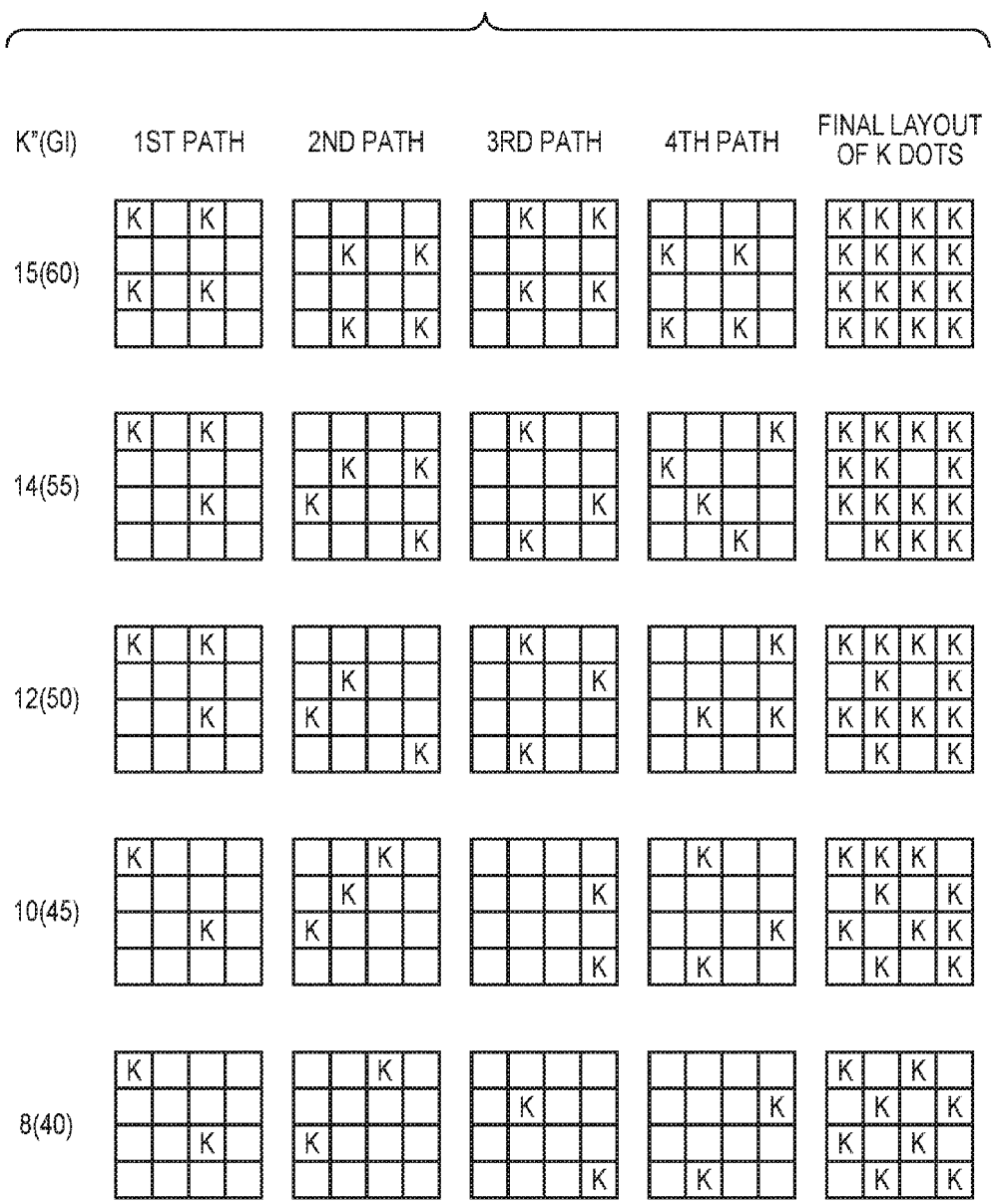
FIG. 9 is a view showing the results of halftone processing of path separation data of a K" value.

FIG. 9 shows the halftone processing results of the path separation data of the K" value shown in FIG. 7C. In FIG. 9, cells in which "K" is printed are on-dots. Note that FIG. 9 also shows the GI value for reference, but it is needless to say that the GI value is irrelevant to the processing of the halftone processor 109.

●Light Print Material

Halftone processing of the path separation data of the Gy" value will be explained with reference to FIGS. 10A and 10B. FIG. 10A shows an example of a 4×4 dither matrix for halftone processing of quantizing the path separation data of the Gy" signal into the 1-bit driving signal. That is, the halftone processor 109 determines the dot layout of each path of the Gy print material by using a dither matrix shown in FIG. 10A.

In the first path, as in the halftone processing of the dark print material, the halftone processor 109 sets '1' (dot-on) as print signals in order from a cell having a minimum value to a cell having a value equal to the path separation data, and sets '0' as print signals in other cells.

In the halftone processing of the dark print material, the dither matrix is updated after the halftone processing of each path. On the other hand, in the halftone processing of the light print material, after performing halftone processing corresponding to a path count int(P/N) where P is the total number of paths and N is the number of stacked layers, the halftone processor 109 initializes the dither matrix and enables stacking of the light print material. By this initialization, superposition of on-dots of the light print material occurs in printing scan of the image generating apparatus 13.

For example, when P=4 and N=2, the dither matrix is initialized after halftone processing of the second path, and superposition of on-dots of the light print material occurs. Also, when P=4 and N=3, the dither matrix is initialized after halftone processing of the first, second, and third paths, and superposition of on-dots of the light print material occurs. The initialization of the dither matrix makes it possible to change a cell which is already "on-dot" to "dot-on" again, and stack the light print material in the same cell position.

FIG. 10B shows the halftone processing results of the path separation data of the Gy" value shown in FIG. 7C. In FIG. 10B, cells in which "G" is printed are on-dots, and cells in which "2G" is printed are dots in which the Gy print material has two layers. Note that FIG. 10B also shows the GI value for reference, but it is needless to say that the GI value is irrelevant to the processing of the halftone processor 109.

Comparison of the final dot layouts shown in FIGS. 9 and 10B reveals that the K dots and Gy dots are exclusively laid out. That is, each K dot is replaced with a two-layered Gy dot in accordance with the gloss value GI. Also, when the gloss value GI has a minimum value (in this example, GI=40), the area ratios of K dots and Gy dots are equal, so monolayered K dots and two-layered Gy dots are laid out into a checkerboard pattern. As a consequence, the thicknesses of the print materials in adjacent dots become different, and the unevenness (height difference) of the surface of a printed image becomes maximum.

An example of four-time printing scan (four paths) has been explained above. However, it is only necessary to print two layers of the light print material and one layer of the dark print material, so an image can also be generated by two paths. In addition, even when using the four paths, the light print material can be printed in the same region in consecutive paths. Regardless of this, however, four-path printing is performed so as to print a print material in the same region in consecutive paths as rarely as possible for the following reason.

A print material lands on a print medium while the material is in a liquid state, and is gradually fixed as a solid on the print medium by permeation of a solvent into the print medium and evaporation of the solvent into air. That is, the print material is in a wet state immediately after the material lands on the print medium. Therefore, a time difference is given between landing timings to wait for fixation of a print material having landed earlier, and a print material is allowed to land on the same region after that. This makes it possible to prevent spread of a wet print material, and stack a bulkier light print material.

As described above, based on the input gloss image data GI, the use amount of the dark print material, which is obtained by a color separation process of the color image data, is replaced with the use amount of the light print material. In addition, the dot layout of the light print material is so determined as to superpose dots of the material, thereby controlling the unevenness of the surface of a printed image. Accordingly, as a gloss value to be reproduced decreases, the area ratio at which the surface unevenness of the printed image is increased increases. As a consequence, a desired gloss reproduction can be obtained in the printed image.

Second Embodiment

An image processing apparatus and image processing method of the second embodiment according to the present invention will be explained below. Note that the same reference numerals as in the first embodiment denote almost the same parts in the second embodiment, and a detailed explanation thereof will be omitted in some cases.

[Outline]

The first embodiment has explained the method of controlling the unevenness of the surface of a printed image by replacing the use amount of a dark print material with a use amount corresponding to a light print material based on the gloss image data GI, as a gloss value to be reproduced decreases, and determining the dot layout of the light print material so as to superpose dots of the light print material.

An image generating apparatus 13 sometimes incorporates, in addition to CMYK print materials (to be referred to as basic-color print materials hereinafter), print materials (to be referred to as spot-color print materials hereinafter) called spot colors such as a red (R) print material, blue (B) print material, and green (G) print material having a complementary color relationship with CMY. In the second embodiment, an example in which the present invention is applied to the image generating apparatus 13 incorporating print materials of seven colors CMYKRGB will be explained.

The image generating apparatus 13 incorporating the basic-color print materials and spot-color print materials controls the unevenness of the surface of a printed image by replacing the use amounts of the spot-color print materials with use amounts corresponding to the CMY print materials as a gloss value to be reproduced decreases, and determining the dot layout of the CMY print materials so as to superpose the CMY print materials.

Figure 1C:
Figure 1D:
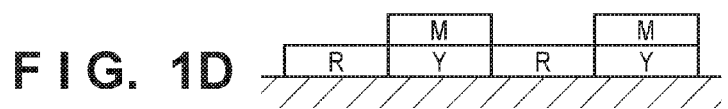

FIG. 1C shows a state in which an image is generated in the whole area of a predetermined region. FIG. 1D shows a state in which an image is generated by one layer of the R print material, and superposition of the Y and M print materials. The reproduced color is the same as that in the case of FIG. 1C. In this case shown in FIG. 1D, an area formed by only the R print material and an area formed by stacked layers of the Y and M print materials coexist, so the unevenness of the surface of the printed image increases, and the gloss decreases.

[Configuration of Apparatus]

FIG. 11 is a block diagram showing a configuration example of an image processing apparatus 12 of the second embodiment. A first color separation processor 114 looks up a color separation table 115, and converts R'G'B' signals output from a color matching unit 102 into coloring material amount signals CMYKRGB. The coloring material amount signals CMYKRGB indicate the use amounts of the basic-color print materials and those of the spot-color print materials of the image generating apparatus 13. Each of the CMYKRGB signals is an 8-bit signal for a corresponding color. The above processing converts the color image data RGB into print data CMYKRGB.

A second color separation processor 116 receives the CMYKRGB signals output from the first color separation processor 114 and gloss image data GI, and converts the CMYKRGB signals into C'M'Y'KR'G'B' signals based on the gloss image data GI. The second color separation processor 116 performs conversion which makes the total amount of the C'M'Y'KR'G'B' signals larger than that of the CMYKRGB signals. That is, to increase the unevenness of the surface of a printed image as gloss to be reproduced decreases, the second color separation processor 116 performs gloss control conversion which replaces the use amounts of the RGB print materials with use amounts corresponding to the CMY print materials.

The second color separation processor 116 performs this gloss control conversion by looking up a gloss control table 117. If the input CMYKRGBGI value is the value of a lattice point in the gloss control table 117, the second color separation processor 116 outputs coloring material amount signals C'M'Y'KR'G'B' printed at the lattice point. Also, if the input CMYKRGBGI value is a value between lattice points in the gloss control table 117, the second color separation processor 116 outputs coloring material amount signals C'M'Y'KR'G'B' by an interpolation process using values printed at lattice points surrounding the value.

The gloss control conversion and a path separation process will be explained with reference to FIGS. 12A and 12B. FIG. 12A shows a case in which red print data which has CMYKRGB values (0, 0, 0, 0, 255, 0, 0), that is, which can be reproduced by only the R print material is input to the second color separation processor 116. In this case, as shown in the second to fourth columns in a table shown in FIG. 12A, the Y and M print materials are not used when gloss value GI=60, and the use amount of the R print material is decreased as the gloss value GI decreases. Then, the use amounts of the Y and M print materials capable of reproducing red by subtractive color mixture are increased. If this red is unreproducible by only the R print material, the results of the first color separation process are, of course, Y≥0, M≥0, K≥0, and R<255. Even in this case, however as the gloss value GI decreases, the use amount of the R print material is decreased, and the use amounts of the Y and M print materials are increased.

Although not shown in FIG. 12A, when the results of the first color separation process indicate, for example, G=255, the use amount of the G print material is decreased, and the use amounts of the Y and C print materials capable of reproducing green by subtractive color mixture are increased, as the gloss value GI decreases. Likewise, when the results of the first color separation process indicate, for example, B=255, the use amount of the B print material is decreased, and the use amounts of the C and M print materials capable of reproducing green by subtractive color mixture are increased, as the gloss value GI decreases.

A path separator 118 performs a path separation process of allocating the C'M'Y'KR'G'B' signal values output from the second color separation processor 116 to each printing scan (path). Note that as in the first embodiment, the path separator 118 uses the print rate table shown in FIG. 7A, and a unit region in a halftone processor 119 has 4×4 dots. Accordingly, the path separator 118 converts each of the 8-bit C'M'Y'KR'G'B' signals into a 4-bit signal of a corresponding color. The fifth to seventh columns in a table shown in FIG. 12A show the results of conversion from the upper 4 bits of each of the R'Y'M' values (8 bits for each color) having undergone the second color separation process to a 4-bit signal of a corresponding color.

FIG. 12B shows path separation data in which R"Y"M" values each converted into 4 bits are allocated to each path based on the print rates, and shows the output from the path separator 118. The path separator 118 converts the C'M'Y'KR'G'B' signals into $C_iM_iY_iK_iR_iG_iB_i$ which is path separation data of the ith path.

The halftone processor 119 determines the dot layout of $C_iM_iY_iK_iR_iG_iB_i$ having undergone the path separation process. That is, the halftone processor 119 generates, for each print material, a 1-bit print signal indicating the print position of an on-dot from the path separation data. In this process, FIG. 8A is used as an initial dither matrix for the spot-color print materials. Also, FIG. 10A is used as an initial dither matrix for the basic-color print materials. Unlike the first embodiment in which layers of the same print material are stacked, however, layers of print materials of different colors are stacked, so the dither matrix is not initialized during the halftone processing.

Figure 13:
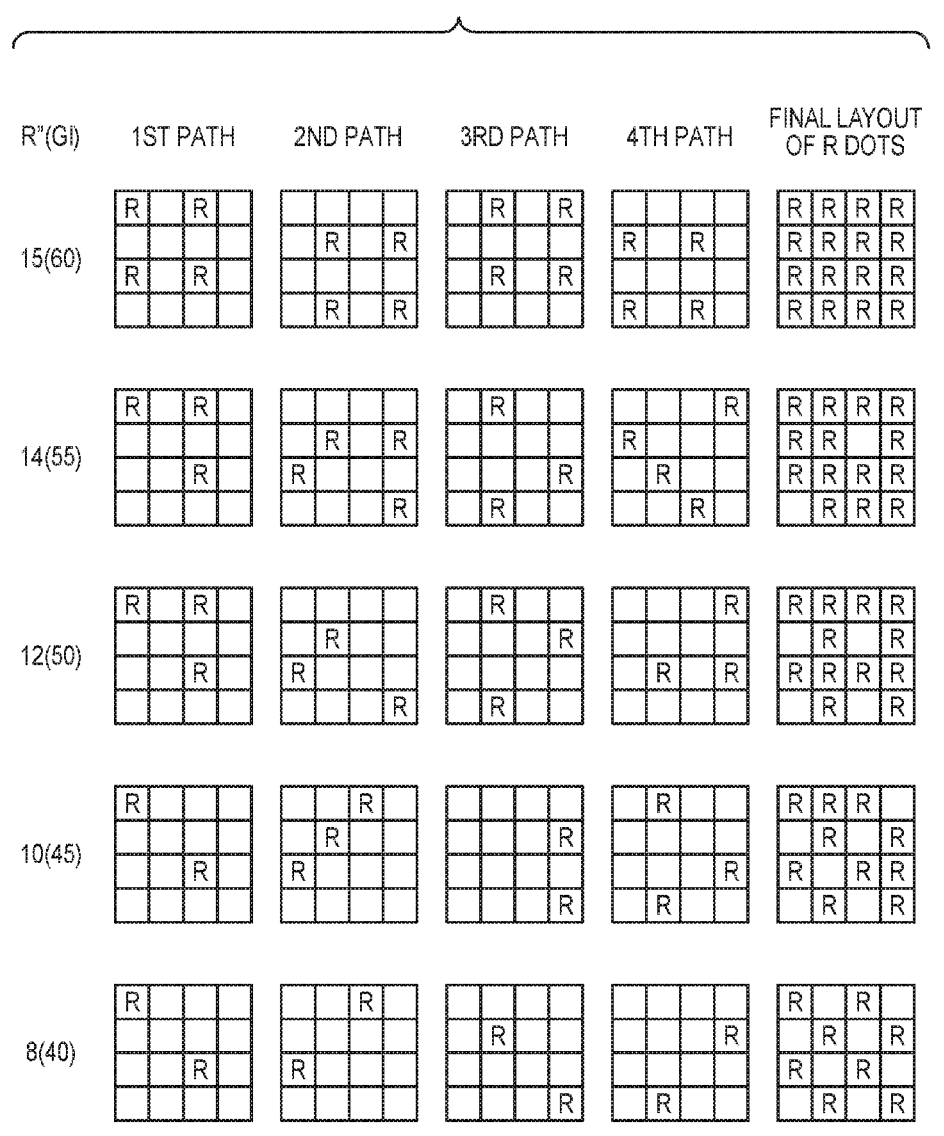
Figure 14:
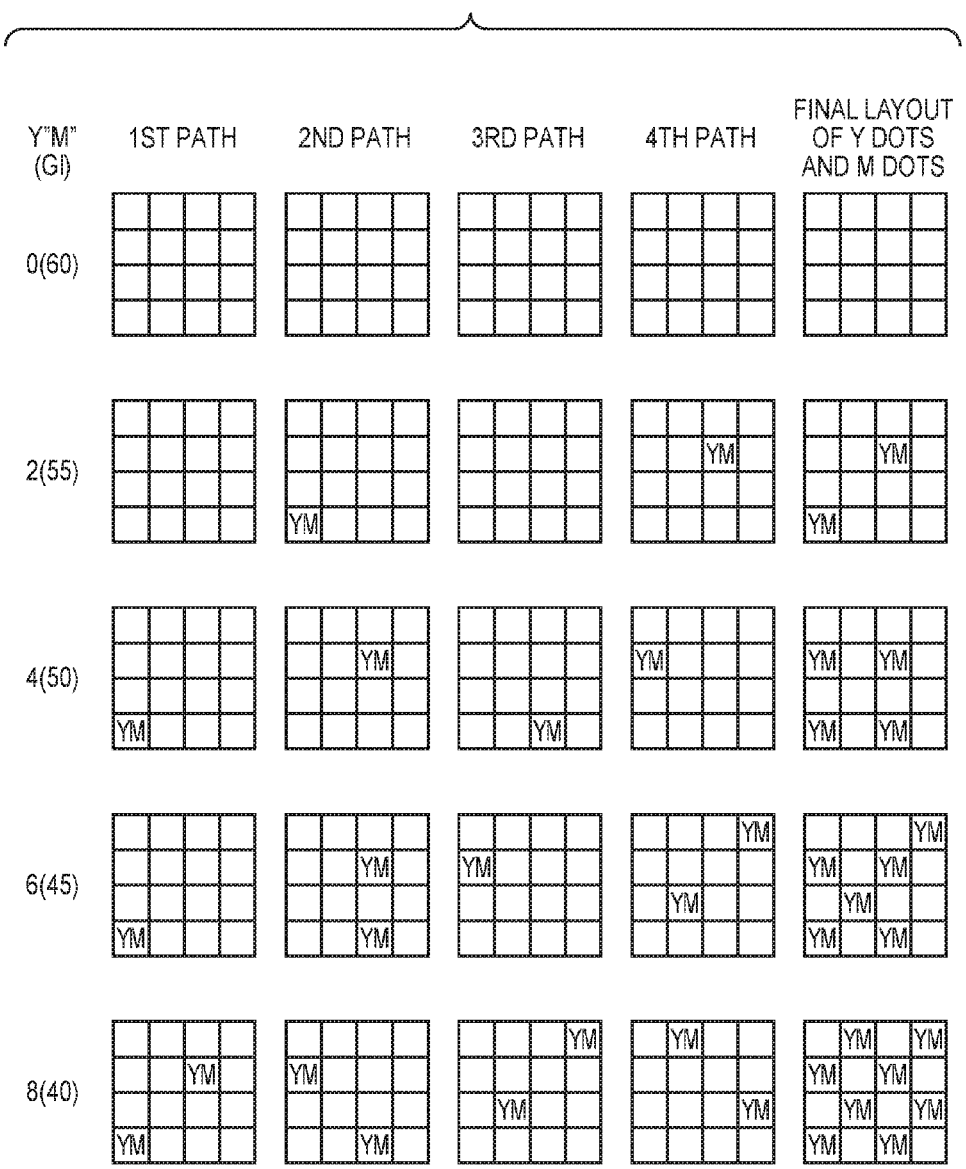
FIG. 14 is a view showing the results of halftone processing of path separation data of Y"M" values.

FIG. 13 shows the results of halftone processing of path separation data of the R" value shown in FIG. 12B. In FIG. 13, cells in which "R" is printed are on-dots. The same cells of the Y and M print materials replaced from the R print material are allocated to on-dots. FIG. 14 shows the results of halftone processing of path separation data of the Y"M" values shown in FIG. 12B. In FIG. 14, cells in which "YM" is printed are on-dots of the Y and M print materials. FIGS. 13 and 14 also show the GI value for reference, but it is needless to say that the GI value has no relation to the processing of the halftone processor 119.

Comparison of the final dot layouts shown in FIGS. 13 and 14 reveals that the R dots and YM dots are exclusively laid out. That is, each R dot is replaced with a two-layered YM dot in accordance with the gloss value GI. Also, when the gloss value GI has a minimum value (in this example, GI=40), the area ratios of the R dots and YM dots are equal, so the monolayered R dots and two-layered YM dots are laid out into a checkerboard pattern. As a consequence, the thicknesses of the print materials in adjacent dots become different, and the unevenness (height difference) of the surface of a printed image becomes maximum.

For the sake of descriptive simplicity, the example in which FIG. 7A is applied as the print rate table for all the print materials has been explained. Therefore, the Y and M print materials are printed in the same area by the same number of paths. To obtain a hit time difference between print materials to be superposed as explained in the first embodiment, different print rate tables are used for the C, Y, and M print materials.

As described above, based on the input gloss image data GI, the use amounts of the spot-color print materials, which are obtained by the color separation process of color image data, are replaced with the use amounts of the CMY print materials. In addition, the unevenness of the surface of a printed image is controlled by determining the dot layout of the CMY print materials so as to superpose the CMY print materials. Accordingly, as a gloss value to be reproduced decreases, the area ratio at which the unevenness of the surface of the printed image is to be increased increases. This makes it possible to obtain a desired gloss reproduction in the printed image.

Note that when the process in step S503 of FIG. 5 is rewritten to R'G'B'→CMYKRGB, and the process in step S504 of FIG. 5 is rewritten to CMYKRGB→C'M'Y'KR'G'B', FIG. 5 becomes equal to a flowchart showing an image generation data generating process of the second embodiment. Therefore, this flowchart showing the image generation data generating process of the second embodiment will be omitted.

Third Embodiment

An image processing apparatus and image processing method of the third embodiment according to the present invention will be explained below. Note that the same reference numerals as in the first and second embodiments denote almost the same parts in the third embodiment, and a detailed explanation thereof will be omitted in some cases.

[Outline]

The first and second embodiments have explained replacement from the use amounts of the dark print materials to those of the light print materials, replacement from the use amounts of the spot-color print materials to those of the CMY print materials, and stacking of the light print materials or the CMY print materials. An image generating apparatus 13 sometimes incorporates a practically colorless transparent clear material in addition to the dark print materials (basic-color print materials), light print materials, and spot-color print materials. In the third embodiment, an example in which the present invention is applied to the image generating apparatus 13 incorporating the basic-color print materials of four colors CMYK and a CL material will be explained.

A clear material (to be referred to as a CL material hereinafter) is mainly used as a gloss adjusting material for adjusting the gloss of a printed material, and generally used for the purpose of increasing the gloss. On the other hand, in the third embodiment, the unevenness of the surface of a printed image is increased by increasing the use amount of the CL material as gloss to be reproduced decreases. Note that the CL material can have a slight color or slight muddiness.

[Configuration of Apparatus]

Figure 15:
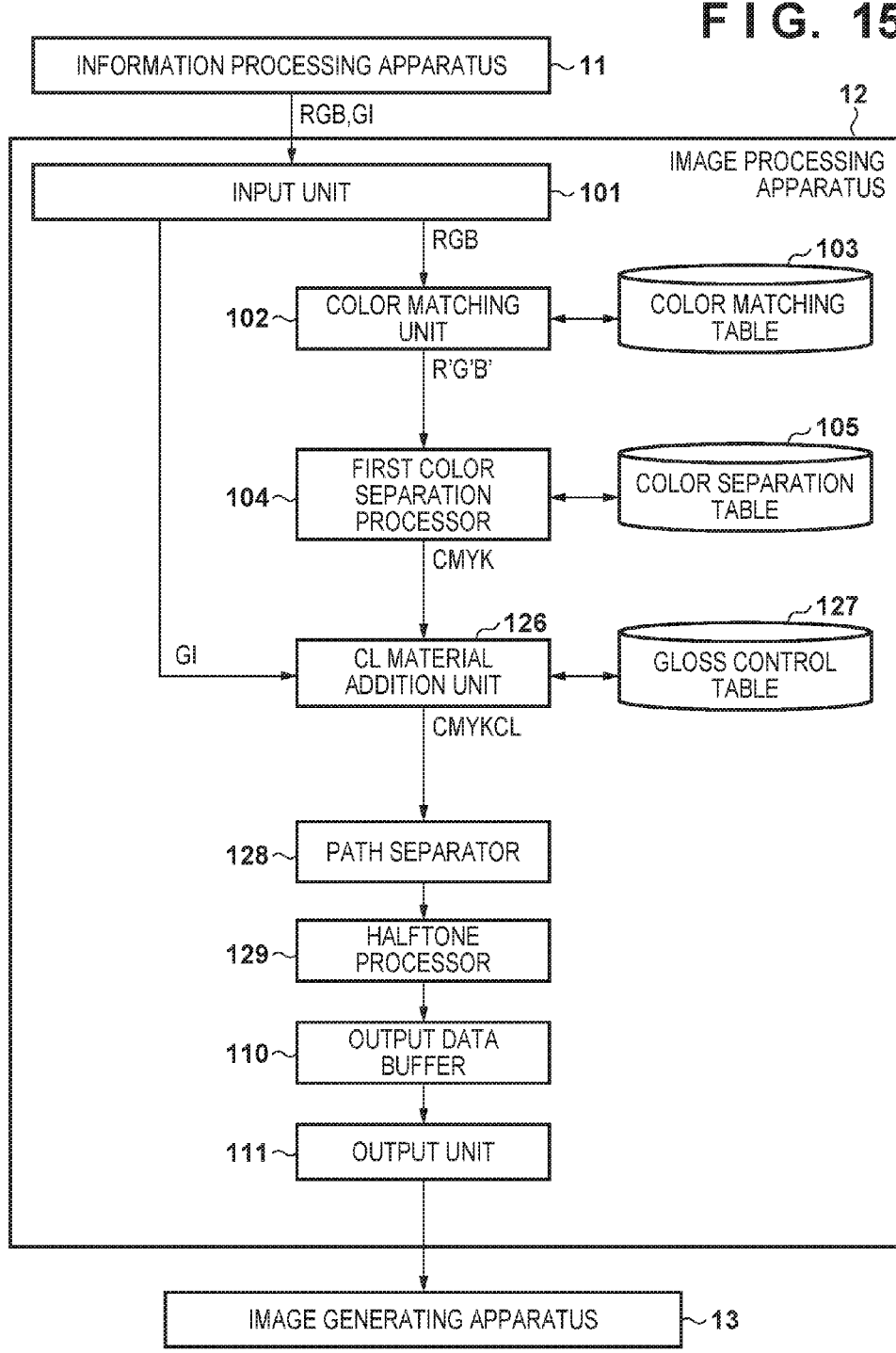
FIG. 15 is a block diagram showing a configuration example of an image processing apparatus of the third embodiment.

FIG. 15 is a block diagram showing a configuration example of an image processing apparatus 12 of the third embodiment. A clear material addition unit (CL material addition unit) 126 receives CMYK signals output from a first color separation processor 104 and gloss image data GI, determines a CL value based on the gloss image data GI, and outputs CMYKCL signals. The CL material addition unit 126 increases the CL value as a gloss value indicated by the gloss image data GI decreases. That is, as gloss to be reproduced decreases, the CL material addition unit 126 increases the use amount of the CL material in order to increase the unevenness of the surface of a printed image.

The CL material addition unit 126 determines the CL signal value by looking up a one-dimensional gloss control table 127. If the input gloss value GI is a print value in the gloss control table 127, the CL material addition unit 126 outputs CMYKCL signals to which a CL value corresponding to the gloss value GI is added. Also, if the input gloss value GI is a value between print values in the gloss control table 127, the CL material addition unit 126 outputs CMYKCL signals to which a CL value determined by an interpolation process using print values sandwiching the gloss value is added.

The determination of the CL value and a path separation process will be explained with reference to FIGS. 16A and 16B. FIG. 16A shows a case in which black print data having CMYK values (0, 0, 0, 255), that is, reproducible by only the K print material is input to the CL material addition unit 126. As shown in the second column of a table shown in FIG. 16A, the use amount of the K print material is irrelevant to the gloss value GI. On the other hand, as shown in the third column, the CL material is not used when gloss value GI=60, and the use amount of the CL material is increased as the gloss value GI decreases. In other words, the use amount of the CL print material is increased as the gloss value GI decreases while maintaining the CMYK signal values.

A path separator 128 performs a path separation process of allocating the CMYKCL signal values output from the CL material addition unit 126 to each printing scan (path). Note that as in the first embodiment, the path separator 128 uses the print rate table shown in FIG. 7A, and a unit region in a halftone processor 129 has 4×4 dots. Accordingly, the path separator 128 converts the CMYKCL signals each having 8 bits into signals each having 4 bits. The fourth column and sixth column in the table shown in FIG. 16A each show the results of conversion from the upper 4 bits of each of the KCL signals (8 bits for each color) to a 4-bit signal.

FIG. 16B shows path separation data in which K"CL" values converted into 4 bits are allocated to each path based on the print rate, and shows the output from the path separator 128. The path separator 128 converts the CMYKCL signals into $C_iM_iY_iK_iCL_i$ as path separation data of the ith path.

The halftone processor 129 determines the dot layout of $C_iM_iY_iK_iCL_i$ having undergone the path separation process. That is, the halftone processor 129 generates, for each print material, a 1-bit print signal indicating the print position of an on-dot from the path separation data. In this process, FIG. 8A is used as an initial dither matrix for the basic-color print materials. Also, FIG. 10A is used as an initial dither matrix for the CL material. Unlike the first embodiment in which layers of the same print material are stacked, however, the basic-color print material and CL material are stacked, so the dither matrix is not initialized during the halftone processing.

The halftone processing will be explained with reference to FIGS. 17A and 17B. FIG. 17A shows the results of halftone processing of path separation data of the K" value shown in FIG. 16B. In FIG. 17A, cells in which "K" is printed are on-dots. FIG. 17B shows the results of halftone processing of path separation data of the CL" value shown in FIG. 16B. In FIG. 17B, cells in which "CL" are printed are on-dots of the CL material. FIG. 17B also shows the GI value for reference, but it is needless to say that the GI value has no relation to the processing of the halftone processor 119.

FIGS. 17A and 17B show that the K print material is printed in the entire area, the CL material is superposed on the K print material except when GI=60, and the superposition area of the CL material increases as the gloss value GI decreases. Note that unevenness need only be formed on the surface of a printed image, so it is possible to lay the CL material on the basic-color print material, and vice versa.

Figure 18:
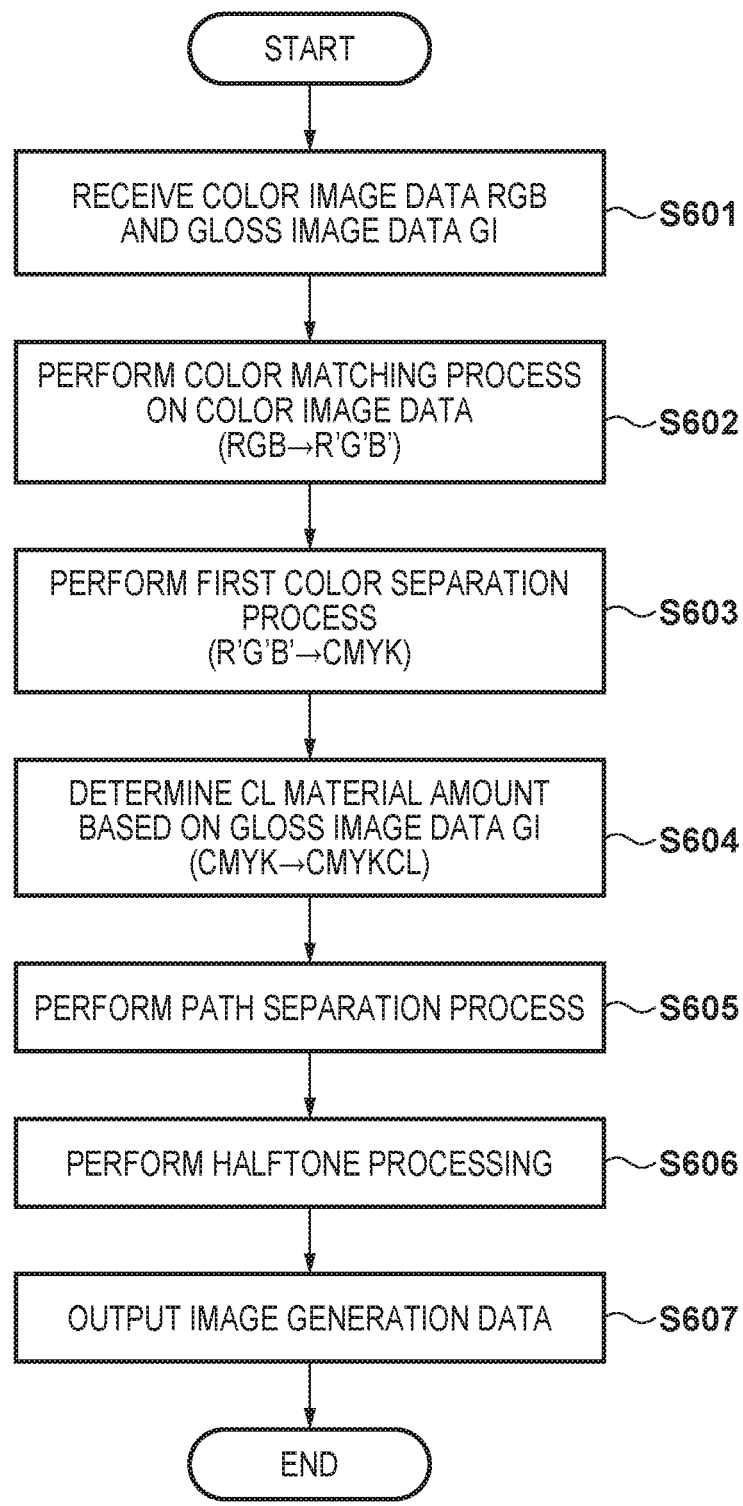
FIG. 18 is a flowchart for explaining an image generation data generating process performed by the image processing apparatus of the third embodiment.

FIG. 18 is a flowchart for explaining an image generation data generating process performed by the image processing apparatus 12 of the third embodiment. An input unit 101 receives color image data RGB and gloss image data GI (step S601). A color matching unit 102 executes a color matching process of converting the input color image data RGB into color signals R'G'B' depending on the image generating apparatus 13 (step S602).

The first color separation processor 104 executes the first color separation process of converting the color signals R'G'B' into print material amount signals CMYK (step S603). The CL material addition unit 126 outputs print material amount signals CMYKCL to which a CL material amount based on the input gloss image data GI is added (step S604).

The path separator 128 executes the path separation process for multipath-printing the print material amount signals CMYKCL (step S605). The halftone processor 129 executes the halftone processing for converting the path separation process results into driving data for driving each print element of the image generating apparatus 13 (step S606).

An output unit 111 outputs image generation data stored in an output data buffer 110 to the image generating apparatus 13 in synchronism with the image generating operation of the image generating apparatus 13 (step S607). The image generation data is output as a whole image or for each unit such as the band width of printing scan. Also, the process from step S601 to step S606 is repetitively executed pixel by pixel.

As described above, the use amount of the CL material is determined based on the input gloss image data GI, and increased as the gloss value decreases. In addition, the dot layout is so determined as to superpose the basic-color print material and CL material, thereby controlling the unevenness of the surface of a printed image. Accordingly, as a gloss value to be reproduced decreases, the area ratio at which the unevenness of the surface of the printed image is increased increases, so a desired gloss reproduction can be obtained in the printed image.

Fourth Embodiment

An image processing apparatus and image processing method of the fourth embodiment according to the present invention will be explained below. Note that the same reference numerals as in the first to third embodiments denote almost the same parts in the fourth embodiment, and a detailed explanation thereof will be omitted in some cases.

[Outline]

The first embodiment has explained the method of controlling the unevenness of the surface of a printed image by replacing the use amounts of the dark print materials with use amounts corresponding to the LcLmGy print materials based on the gloss image data GI as a gloss value to be reproduced decreases, and determining the dot layout of the light print materials so as to superpose the light print materials.

An image generating apparatus 13 sometimes incorporates a plurality of low-density black-based print materials having relatively low densities with respect to the K print material which is a high-density black-based print material having a relatively high density and included in the basic-color print materials. For example, the image generating apparatus 13 sometimes incorporates three types of print materials, that is, K, Gy, and Lgy in descending order of density, as black-based print materials (to be referred to as BK-based print materials hereinafter). In this case, Gy and Lgy are the low-density black-based print materials. In the fourth embodiment, an example in which the present invention is applied to the image generating apparatus 13 incorporating print materials of six colors CMYKGyLgy will be explained.

When using the three types of BK-based print materials, a lower gloss can be implemented by replacing the K print material with stacked layers of the Gy print material or Lgy print material so that one layer of the K print material, stacked layers of the Gy print material, and stacked layers of the Lgy print material coexist.

FIG. 1E shows an image in which the K print material is partially replaced with two layers of the Gy print material. FIG. 1F shows an image in which the K print material is partially replaced with four layers of the Lgy print material. Note that these layouts are based on the assumption that the color reproduced by two layers of the Gy print material, the color reproduced by four layers of the Lgy print material, and the color reproduced by one layer of the K print material are equal. FIG. 1G shows an image in which the K print material is partially replaced with two layers of the Gy print material or four layers of the Lgy print material.

A graph shown on the right side of each of FIGS. 1E, 1F, and 1G is a histogram (normal histogram) of the normal angle of the surface of a corresponding printed image. These histograms are obtained by dividing the measurement results of the surface shapes of samples of FIGS. 1E, 1F, and 1G into fine regions, and measuring the normal directions of these fine regions.

Comparison of the normal histograms shown in FIGS. 1E and 1F reveals that normal angles at which the frequency is highest are different. Furthermore, the frequency distribution is broad in the normal histogram shown in FIG. 1G. That is, the surfaces of the fine regions in the image shown in FIG. 1G incline in various directions, and as a consequence the direction of light reflected by the image surface distributes at various angles. Accordingly, the gloss of the image shown in FIG. 1G is lower than those of the images shown in FIGS. 1E and 1F.

[Configuration of Apparatus]

Figure 19:
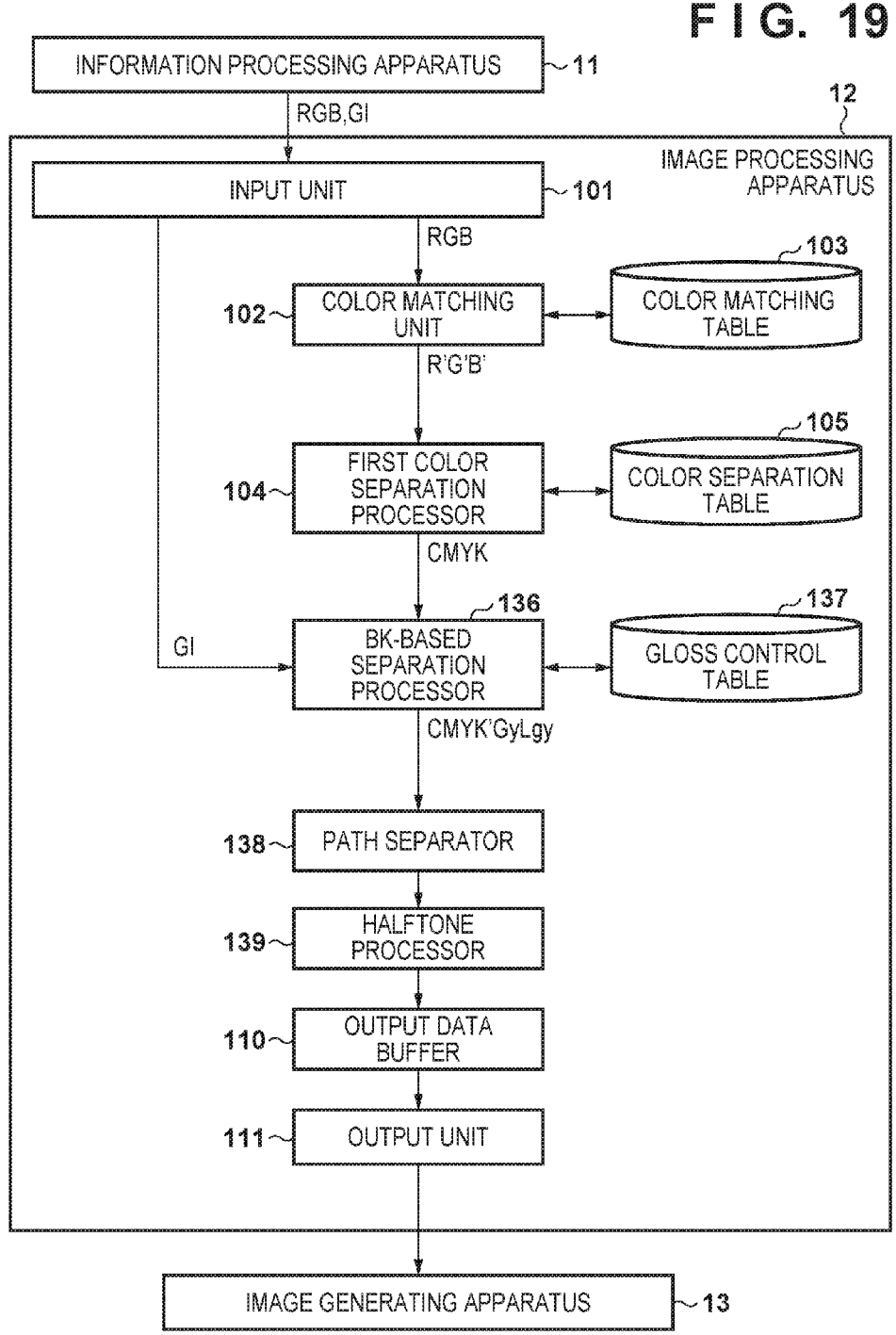
FIG. 19 is a block diagram showing a configuration example of an image processing apparatus of the fourth embodiment.

FIG. 19 is a block diagram showing a configuration example of an image processing apparatus 12 of the fourth embodiment. A black-based separation processor (BK-based separation processor) 136 receives CMYK signals output from a first color separation processor 104 and gloss image data GI, performs a separation process on the BK-based print material based on the gloss image data GI, thereby converting the CMYK signals into CMYK'GyLgy signals.

The BK-based separation processor 136 performs conversion which replaces the use amount of the K print material with a use amount corresponding to the Gy print material or Lgy print material as a gloss value indicated by the gloss image data GI decreases. That is, the BK-based separation processor 136 performs gloss control conversion which increases the use amounts of the Gy print material and Lgy print material in order to increase the unevenness of the surface of a printed image as gloss to be reproduced decreases.

The BK-based separation processor 136 performs this gloss control conversion by looking up a gloss control table 137. If the input CMYKGI value is the value of a lattice point in the gloss control table 137, the BK-based separation processor 136 outputs coloring material amount signals CMYK'GyLgy printed in the lattice point. If the input CMYKGI value is a value between lattice points in the gloss control table 137, the BK-based separation processor 136 outputs the coloring material amount signals CMYK'GyLgy by performing an interpolation process using values printed in lattice points surrounding the value.

The gloss control conversion and a path separation process will be explained with reference to FIGS. 20A and 20B. FIG. 20A shows a case in which black print data having CMYK values (0, 0, 0, 0, 255), that is, reproducible by only the K print material is input to the BK-based separation processor 136. In this case, as shown in the second to fourth columns in a table shown in FIG. 20A, the Gy print material and Lgy print material are not used when gloss value GI=60. When the GI value decreases, however, the use amount of the K print material is decreased, and the use of the Gy print material is first started.

When the GI value further decreases, the use amount of the Gy print material is increased, and the use of the Lgy print material is started. When the GI value further decreases after that, increasing the use amount of the Gy print material is stopped, and the use amount of the Lgy print material is increased. That is, the replacement of the use amounts is performed on low-density black-based print materials corresponding in number to the GI value.

A path separator 138 performs a path separation process which allocates the CMYK'GyLgy signal values output from the BK-based separation processor 136 to each printing scan (path). Note that as in the first embodiment, the path separator 138 uses the print rate table shown in FIG. 7A, and a unit region in a halftone processor 139 has 4×4 dots. Accordingly, the path separator 138 converts the CMYK'GyLgy signals each having 8 bits into signals each having 4 bits. The fifth to seventh columns in the table shown in FIG. 20A each show the results of conversion from the upper 4 bits of each of the K'GyLgy values (8 bits for each color) to a 4-bit signal.

FIG. 20B shows path separation data in which K"LC" values converted into 4 bits are allocated to each path based on the print rate, and shows the output from the path separator 138. The path separator 138 converts the CMYK'GyLgy signals into $C_iM_iY_iK_iGy_iLgy_i$ as path separation data of the ith path.

The halftone processor 139 determines a dot layout for $C_iM_iY_iK_iGy_iLgy_i$ having undergone the path separation process. That is, the halftone processor 139 generates, for each print material, a 1-bit print signal indicating the print position of an on-dot from the path separation data. In this process, FIG. 8A is used as an initial dither matrix for the basic-color print materials. Therefore, the results of halftone processing of the path separation data of the K" value shown in FIG. 20B are the same as those shown in FIG. 9.

Halftone processing of the Gy print material will be explained with reference to FIGS. 21A and 21B. FIG. 21A shows an example of an initial dither matrix for the Gy print material. As in the first embodiment, the dither matrix is initialized during the halftone processing in order to superpose two layers of the Gy print material. FIG. 21B shows the results of halftone processing of path separation data of the Gy" value shown in FIG. 20B. In FIG. 21B, cells in which "G" is printed are on-dots, and cells in which "2G" is printed are dots each having two layers of the Gy print material.

Halftone processing of the Lgy print material will be explained with reference to FIGS. 22A and 22B. FIG. 22A shows an example of a dither matrix for the Lgy print material. To superpose four layers of the Lgy print material (to perform superposition in all paths), the dither matrix is not initialized during the halftone processing. FIG. 22B shows the results of halftone processing of path separation data of the Lgy" value shown in FIG. 20B. In FIG. 22B, cells in which "Lg" is printed are on-dots, and cells in which "4L" is printed are dots each having four layers of the Lgy print material. Note that FIGS. 21B and 22B also show the GI value for reference, but it is needless to say that the GI value has no relation to the processing of the halftone processor 139.

Figure 23:
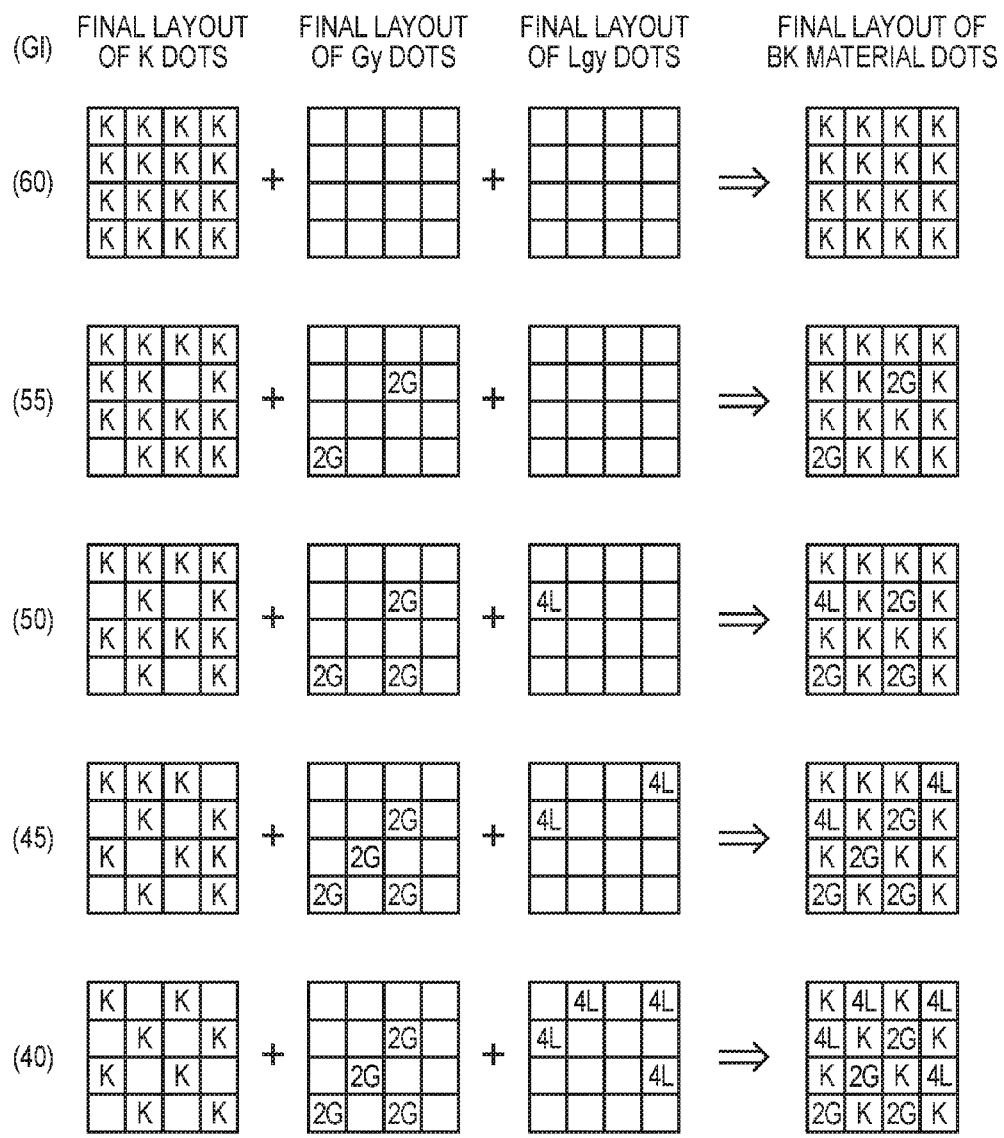
FIG. 23 is a view showing final dot layouts of BK-based print materials.

FIG. 23 shows the final dot layouts of the BK-based print materials. As the gloss value GI decreases, a printed image generation dot changes such that "one layer of K dot"→"one layer of K dot+two layers of Gy dot"→"one layer of K dot+two layers of Gy dot+four layers of Lgy dot". As described previously, when the relationship between a density Dk of the K print material, a density Dgy of the Gy print material, and a density Dlgy of the Lgy print material is Dk:Dgy:Dlgy=4:2:1, no color change is observed in 4×4 regions shown in FIG. 23, so gloss corresponding to the gloss value GI is reproduced in the image.

As described above, a plurality of BK-based print materials having different densities are used, and the use amount of the K print material is distributed to the use amounts of a plurality of low-density BK-based print materials. In addition, the dot layout of a plurality of low-density, BK-based print materials is so determined as to obtain superposition of layers corresponding to the densities of the plurality of low-density BK-based print materials, thereby controlling the unevenness of the surface of a printed image. Therefore, it is possible to perform area ratio control which increases the surface unevenness of a printed image step by step. This makes it possible to obtain a desired gloss reproduction and smoother gloss change in a printed image.

Furthermore, gloss can be decreased regardless of gradation. Especially in a dark portion of an image, a decorating effect can be improved by widening a low-gloss-side reproduction range. Also, when increasing the surface unevenness of a printed image by replacing, in each area, a high-density print material having a relatively high density with a low-density print material having a relatively low density, the colors or densities of adjacent areas are made as equal as possible. This effectively prevents deterioration of the granularity.

Note that when the process in step S504 of FIG. 5 is rewritten to CMYK→CMYK'GyLgy, FIG. 5 becomes equal to a flowchart showing an image generation data generating process of the fourth embodiment. Accordingly, a flowchart showing the image generation data generating process of the fourth embodiment will be omitted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-182229 filed Sep. 15, 2015 and 2016-166014 filed Aug. 26, 2016, which are hereby incorporated by reference herein in their entirety.

What is claimed is:

1. An image processing apparatus comprising:
    an input unit configured to receive color image data and gloss image data of an image to be printed;
    a first color separation unit configured to convert the color image data into a first print material amount signal representing a use amount of a dark print material having a relatively high density;
    a second color separation unit configured to generate a second print material amount signal representing a use amount corresponding to light print material having a relatively low density, by performing a use amount replacement which replaces a use amount corresponding to the gloss image data, of the dark print material use amount indicated by the first print material amount signal, with the use amount corresponding to the light print material;
    a path separation unit configured to convert the second print material amount signal into path separation data corresponding to each printing scan of an image generating apparatus; and
    a halftone processing unit configured to perform halftone processing on the path separation data to generate a print signal indicating a print position of an on-dot, for each of the dark print material and the light print material, thereby generating the print signal which causes superposition of on-dots of the light print material in printing scan of the image generating apparatus.

2. The image processing apparatus according to claim 1, wherein the dark print material having the relatively high density is a high-density black-based print material, and the light print material having the relatively low density is a low-density black-based print material.

3. The image processing apparatus according to claim 2, wherein
    the image generating apparatus comprises a plurality of low-density black-based print materials having different densities, as the low-density black-based print material, and
    the second color separation unit performs the use amount replacement on low-density black-based print materials corresponding in number to the gloss image data.

4. The image processing apparatus according to claim 1, wherein the use amount replacement is performed when the gloss image data is not more than an upper limit of a gloss reproduction range of the image generating apparatus.

5. The image processing apparatus according to claim 1, wherein a replacement amount in the use amount replacement increases as the gloss image data reduces.

6. The image processing apparatus according to claim 1, wherein the use amount replacement makes a sum total of signal values of the second print material amount signal larger than a sum total of signal values of the first print material amount signal.

7. An image processing apparatus comprising:
    an input unit configured to receive color image data and gloss image data of an image to be printed;
    a first color separation unit configured to convert the color image data into a first print material amount signal representing a use amount of a basic-color print material and a use amount of a spot-color print material which reproduces a color different from the basic-color print material;
    a second color separation unit configured to generate a second print material amount signal representing a use amount corresponding to a plurality of basic-color print materials corresponding to the spot-color print material, by performing a use amount replacement which replaces a use amount corresponding to the gloss image data, of the basic-color print material use amount and the spot-color print material use amount indicated by the first print material amount signal, with use amounts corresponding to the plurality of basic-color print materials;
    a path separation unit configured to convert the second print material amount signal into path separation data corresponding to each printing scan of an image generating apparatus; and
    a halftone processing unit configured to perform halftone processing on the path separation data to generate a print signal indicating a print position of an on-dot, for each of the basic-color print material and the spot-color print material, thereby generating the print signal which causes superposition of on-dots of the plurality of basic-color print materials corresponding to the spot-color print material in printing scan of the image generating apparatus.

8. The image processing apparatus according to claim 7, wherein the plurality of basic-color print materials corresponding to the spot-color print material are capable of reproducing a color which the spot-color print material reproduces.

9. An image processing method comprising:
    receiving color image data and gloss image data of an image to be printed;

converting the color image data into a first print material amount signal representing a use amount of a dark print material having a relatively high density;

generating a second print material amount signal representing a use amount corresponding to a light print material having a relatively low density, by performing a use amount replacement which replaces a use amount corresponding to the gloss image data, of the basic color print material use amount indicated by the first print material amount signal, with the use amount corresponding to the light print material;

converting the second print material amount signal into path separation data corresponding to each printing scan of an image generating apparatus; and performing halftone processing on the path separation data to generate a print signal indicating a print position of an on-dot, for each of the dark print material and the light print material, thereby generating the print signal which causes superposition of on-dots of the light print material in printing scan of the image generating apparatus.

10. The image processing method according to claim 9, wherein the dark print material having the relatively high density is a high-density black-based print material, and the light print material having the relatively low density is a low-density black-based print material.

11. An image processing method comprising:

receiving color image data and gloss image data of an image to be printed;

converting the color image data into a first print material amount signal representing a use amount of a basic-color print material and a use amount of a spot-color print material which reproduces a color different from the basic-color print material;

generating a second print material amount signal representing a use amount corresponding to a plurality of basic-color print materials corresponding to the spot-color print material, by performing a use amount replacement which replaces a use amount corresponding to the gloss image data, of the basic-color print material use amount and the spot-color print material use amount indicated by the first print material amount signal, with use amounts corresponding to a plurality of basic-color print materials;

converting the second print material amount signal into path separation data corresponding to each printing scan of an image generating apparatus; and performing halftone processing on the path separation data to generate a print signal indicating a print position of an on-dot, for each of the basic-color print material and the spot-color print material, thereby generating the print signal which causes superposition of on-dots of the plurality of basic-color print materials corresponding to the spot-color print material in printing scan of the image generating apparatus.

\* \* \* \* \*